United States Patent
Fryman et al.

(10) Patent No.: US 12,455,741 B2
(45) Date of Patent: Oct. 28, 2025

(54) LOW OVERHEAD ERROR CORRECTION CODE

(71) Applicant: Intel Corporation, Santa Clara, CA (US)

(72) Inventors: Joshua B. Fryman, Corvallis, OR (US); Byoungchan Oh, Portland, OR (US); Jason Howard, Portland, OR (US); Sai Dheeraj Polagani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 550 days.

(21) Appl. No.: 17/711,646

(22) Filed: Apr. 1, 2022

(65) Prior Publication Data
US 2022/0229723 A1    Jul. 21, 2022

Related U.S. Application Data

(60) Provisional application No. 63/295,280, filed on Dec. 30, 2021, provisional application No. 63/293,590, filed on Dec. 23, 2021.

(51) Int. Cl.
*G06F 11/00* (2006.01)
*G06F 9/30* (2018.01)
(Continued)

(52) U.S. Cl.
CPC ........ *G06F 9/3004* (2013.01); *G06F 9/30003* (2013.01); *G06F 9/30007* (2013.01); *G06F 9/3001* (2013.01); *G06F 9/30029* (2013.01); *G06F 9/30032* (2013.01); *G06F 9/30043* (2013.01); *G06F 9/3455* (2013.01); *G06F 9/3851* (2013.01); *G06F 9/3877* (2013.01); *G06F 11/1044* (2013.01);
(Continued)

(58) Field of Classification Search
CPC .................................................. G06F 11/1044
See application file for complete search history.

(56) References Cited

U.S. PATENT DOCUMENTS 8,139,073 B1 *  3/2012  Van Dyke ........... G06F 13/1626
                                                        345/555
9,026,888 B2 *  5/2015  Kwok ..................... G06F 11/00
                                                        714/763
(Continued)

OTHER PUBLICATIONS

Wang, Ziqi, "COP: To Compress and Protect Main Memory, Paper Review," GHC 6023, Jun. 8, 2020 (3 pages).

*Primary Examiner* — Amine Riad
(74) *Attorney, Agent, or Firm* — Alliance IP, LLC

(57) ABSTRACT

Memory requests are protected by encoding memory requests to include error correction codes. A subset of bits in a memory request are compared to a pre-defined pattern to determine whether the subset of bits matches a pre-defined pattern, where a match indicates that a compression can be applied to the memory request. The error correction code is generated for the memory request and the memory request is encoded to remove the subset of bits, add the error correction code, and add at least one metadata bit to the memory request to generate a protected version of the memory request, where the at least one metadata bit identifies whether the compression was applied to the memory request.

19 Claims, 28 Drawing Sheets

(51) Int. Cl.
*G06F 9/345* (2018.01)
*G06F 9/38* (2018.01)
*G06F 11/10* (2006.01)
*G06F 12/02* (2006.01)
*G06F 12/1081* (2016.01)
*G06F 13/28* (2006.01)
*H04L 41/14* (2022.01)
*H04L 43/045* (2022.01)
*H04L 43/062* (2022.01)
*H04L 49/00* (2022.01)
*H04L 49/9047* (2022.01)

(52) U.S. Cl.
CPC ...... *G06F 12/0238* (2013.01); *G06F 12/1081* (2013.01); *G06F 13/28* (2013.01); *H04L 41/145* (2013.01); *H04L 43/045* (2013.01); *H04L 43/062* (2013.01); *H04L 49/3063* (2013.01); *H04L 49/9047* (2013.01); *G06F 2213/28* (2013.01)

(56) References Cited

U.S. PATENT DOCUMENTS 11,150,844 B2 * 10/2021 Sato ..................... G06F 3/0616
2020/0278937 A1 9/2020 Durham et al.

* cited by examiner

LOW OVERHEAD ERROR CORRECTION CODE

RELATED APPLICATIONS

This application claims benefit to U.S. Provisional Patent Application Ser. No. 63/293,590, filed Dec. 23, 2021 and U.S. Provisional Patent Application Ser. No. 63/295,280, filed Dec. 30, 2021, both of which are incorporated by reference herein in their entirety.

STATEMENT REGARDING FEDERALLY SPONSORED RESEARCH AND DEVELOPMENT

This invention was made with Government support under Agreement No. HR0011-17-3-0004, awarded by DARPA. The Government has certain rights in the invention.

FIELD

The present disclosure relates in general to the field of computer architecture, and more specifically, to error correction on computing interconnects.

BACKGROUND

A datacenter may include one or more platforms each including at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications. Bit errors may arise on networks, links, and interconnect fabrics used to interconnect components in a datacenter. Error detection and error correction mechanisms have been developed to attempt to address such errors in modern computing systems.

BRIEF DESCRIPTION OF THE DRAWINGS

Like reference numbers and designations in the various drawings indicate like elements.

DETAILED DESCRIPTION

Figure 1:
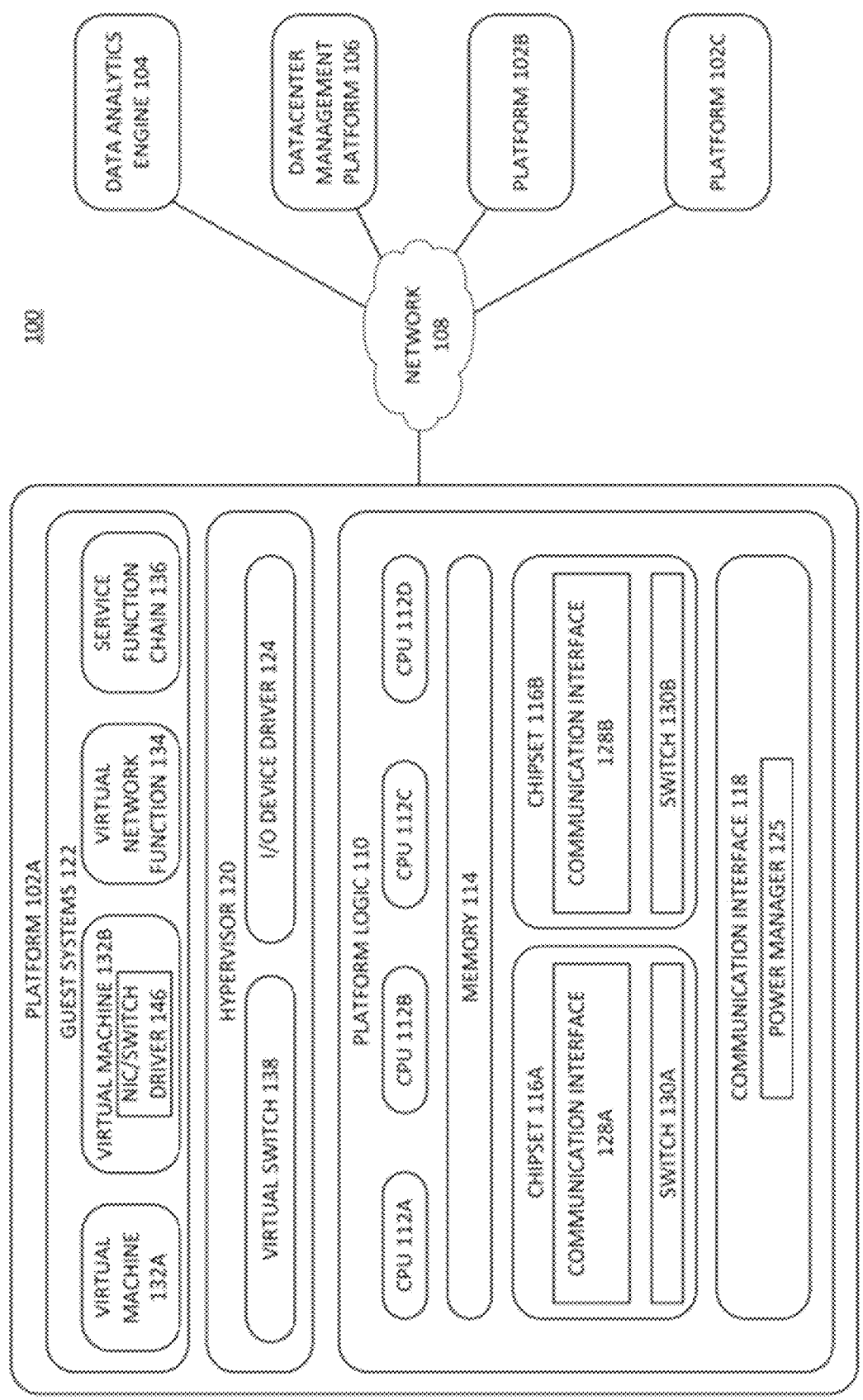
FIG. 1 illustrates a block diagram of components of an example datacenter.

FIG. 1 illustrates a block diagram of components of a datacenter 100 in accordance with certain embodiments. In the embodiment depicted, datacenter 100 includes a plurality of platforms 102 (e.g., 102A, 102B, 102C, etc.), data analytics engine 104, and datacenter management platform 106 coupled together through network 108. A platform 102 may include platform logic 110 with one or more central processing units (CPUs) 112 (e.g., 112A, 112B, 112C, 112D), memories 114 (which may include any number of different modules), chipsets 116 (e.g., 116A, 116B), communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

Each platform 102 may include platform logic 110. Platform logic 110 includes, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that includes multiple platforms coupled together through network 108 (which may include, e.g., a rack or backplane switch).

CPUs 112 may each include any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removably coupled to platform 102. CPU 112 is described in further detail below in connection with FIG. 4. Although four CPUs are shown, a platform 102 may include any suitable number of CPUs.

Memory 114 may include any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also include storage for instructions that may be executed by the cores of CPUs 112 or other processing elements (e.g., logic resident on chipsets 116) to provide functionality associated with components of platform logic 110. Additionally or alternatively, chipsets 116 may each include memory that may have any of the characteristics described herein with respect to memory 114. Memory 114 may also store the results and/or intermediate results of the various calculations and determinations performed by CPUs 112 or processing elements on chipsets 116. In various embodiments, memory 114 may include one or more modules of system memory coupled to the CPUs through memory controllers (which may be external to or integrated with CPUs 112). Memory controller and CPU architectures may include memory controllers used with ARM processor architectures, x86 architectures, tensor processing unit architectures, graphical processing unit architectures, hardware accelerators, and other platforms. Such memory controllers may incorporate compression and ECC encoding logic as discussed herein. In various embodiments, one or more particular modules of memory 114 may be dedicated to a particular CPU 112 or other processing device or may be shared across multiple CPUs 112 or other processing devices.

A platform 102 may also include one or more chipsets 116 including any suitable logic to support the operation of the CPUs 112. In some cases, chipsets 116 may be implementations of graph processing devices, such as discussed herein. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via one or more integrated I/O controllers resident on each CPU.

Chipsets 116 may each include one or more communication interfaces 128 (e.g., 128A, 128B). Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130 (e.g., 130A, 130B)) and another device coupled to network 108. In some embodiments, network 108 may include a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (i.e., software) switch.

Platform logic 110 may include an additional communication interface 118. Similar to communication interface 128, this additional communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 includes one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may include a processor core interrupt; a request to instantiate a software component, such as an I/O device driver 124 or virtual machine 132 (e.g., 132A, 132B); a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may include a single virtual machine (e.g., virtual machine 132A or 132B) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132B may be paravirtualized. For example, the virtual machine 132B may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may include a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining 136 may provide the ability to define an ordered list of network services (e.g. firewalls, load balancers) that are stitched together in the network to create a service chain.

A hypervisor 120 (also known as a virtual machine monitor) may include logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may include a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may include a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may include any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can include any number of hardware or software elements coupled to (and in communication with) each other through a communications medium. In various embodiments, guest systems 122 may communicate with nodes that are external to the datacenter 100 through network 108.

Current practices in data analytics and artificial intelligence perform tasks such as object classification on unending streams of data. Computing infrastructure for classification is predominantly oriented toward "dense" compute, such as matrix computations. The continuing exponential growth in generated data has shifted some compute to be offloaded to GPUs and other application-focused accelerators across multiple domains that are dense-compute dominated. However, the next step in the evolution in both artificial intelligence (AI), machine learning, and data analytics is reasoning about the relationships between these classified objects. In some implementations, a graph structure (or data structure) may be defined and utilized to define relationships between classified objects. For instance, determining the relationships between entities in a graph is the basis of graph analytics. Graph analytics poses important challenges on existing processor architectures due to its sparse structure.

High-performance large scale graph analytics is essential to timely analyze relationships in big data sets. The combination of low performance and very large graph sizes has traditionally limited the usability of graph analytics. Indeed, conventional processor architectures suffer from inefficient resource usage and bad scaling on graph workloads. Recognizing both the increasing importance of graph analytics and the need for vastly improved sparse computation performance compared to traditional approaches, an improved system architecture is presented herein that is adapted to performing high-performance graph processing by addressing constraints across the network, memory, and compute architectures that typically limit performance on graph workloads.

Figure 2A:
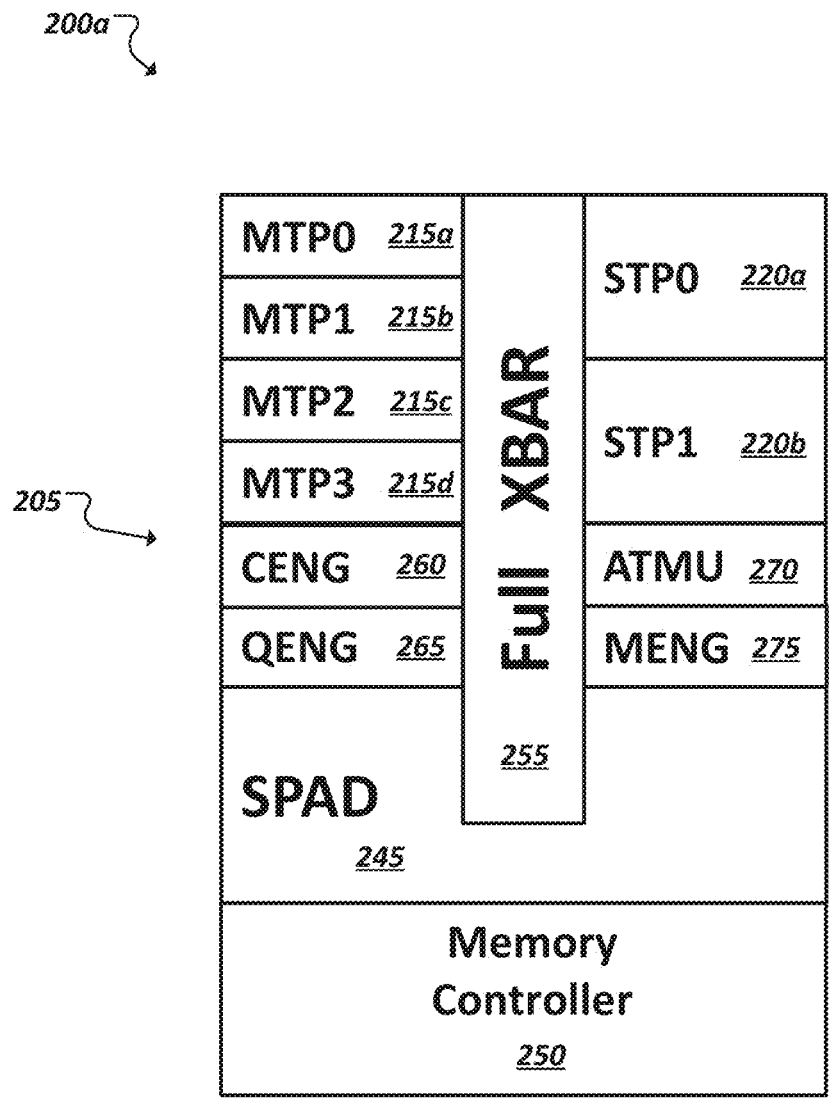
FIG. 2A is a simplified block diagram illustrating an example graph processing core.

FIG. 2A is a simplified block diagram 200*a* representing the general architecture of an example graph processing core 205. While a graph processing core 205, as discussed herein, may be particularly adept, at an architectural level, at handling workloads to implement graph-based algorithms, it should be appreciated that the architecture of a graph processing core 205 may handle any program developed to utilize its architecture and instruction set, including programs entirely unrelated to graph processing. Indeed, a graph processing core (e.g., 205) may adopt an architecture configured to provide massive multithreading and enhanced memory efficiency to minimize latency to memory and hide remaining latency to memory. Indeed, the high input/output (I/O) and memory bandwidth of the architecture enable the graph processing core 205 to be deployed in a variety of applications where memory efficiency is at a premium and memory bandwidth requirements made by the application are prohibitively demanding to traditional processor architectures. Further, the architecture of the graph processing core 205 may realize this enhanced memory efficiency by granularizing its memory accesses in relatively small, fixed chunks (e.g., 8B random access memory), equipping the cores with networking capabilities optimized for corresponding small transactions, and providing extensive multithreading.

In the example of FIG. 2A, an example graph processing core 205 may include a number of multi-threaded pipelines or cores (MTCs) (e.g., 215*a-d*) and a number single-threaded pipelines or cores (e.g., 220*a-b*). In some implementations, the MTCs and STCs may architecturally the same, but for the ability of the MTCs to support multiple concurrent thread and switching between these threads. For instance, respective MTC and STC may have 32 registers per thread, all state address map, and utilize a common instruction set architecture (ISA). In one example, the pipeline/core ISAs may be Reduced Instruction Set Computer (RISC)-based, fixed length instructions.

In one example, respective MTC (e.g., 215a-d) may support sixteen threads with only minimal interrupt handling. For instance, each thread in an MTC may execute a portion of a respective instruction, with the MTC switching between the active threads automatically or opportunistically (e.g., switch from executing one thread to the next in response to a load operation by the first thread so as to effectively hide the latency of the load operation (allowing the other thread or threads to operate during the cycles needed for the load operation to complete), among other examples). An MTC thread may be required to finishing executing its respective instruction before taking on another. In some implementations, the MTCs may adopt a barrel model, among other features or designs. STC's may execute a single thread at a time and may support full interrupt handling. Portions of a workload handled by a graph processing core 205 may be divided not only between the MTCs (e.g., with sixteen threads per MTC), but also between the MTCs 215a-d and STCs 220a-b. For instance, STCs 220a-b may be optimized for various types of operations (e.g., load-store forwarding, branch predictions, etc.) and programs may make use of STCs for some operations and the multithreading capabilities of the MTCs for other instructions.

An example graph processing core 205 may include additional circuitry to implement components such as a scratchpad 245, uncore, and memory controller (e.g., 250). Components of the graph processing core 205 may be interconnected via a crossbar interconnect (e.g., a full crossbar 255) that ties all components in the graph processing core 205 together in a low latency, high bandwidth network. The memory controller 250 may be implemented as a narrow channel memory controller, for instance, supporting a narrow, fixed 8-byte memory channel. Data pulled using the memory controller from memory in the system may be loaded into a scratchpad memory region 245 for use by other components of the graph processing core 205. In one example, the scratchpad may provide 2 MB of scratchpad memory per core (e.g., MTC and STC) and provide dual network ports (e.g., via 1 MB regions). The memory controller may be equipped with compression and ECC encoding functionality, consistent with the features and functions discussed below. Additionally, such functionality may be provided in a wide array of memory controllers and memory management entities, including memory management entities managing far memory, near memory, cache memory, scratchpad memory, pooled memory, tiered memory, and the like.

In some implementations, an uncore region of a graph processing core 205 may be equipped with enhanced functionality to allow the MTCs 215a-d and STCs 220a-b to handle exclusively substantive, algorithmic workloads, with supporting work handled by the enhanced uncore, including synchronization, communication, and data movement/migration. The uncore may perform a variety of tasks including copy and merge operations, reductions, gathers/scatters, packs/unpacks, in-flight matrix transposes, advanced atomics, hardware collectives, reductions in parallel prefixes, hardware queuing engines, and so on. The ISA of the uncore can come from the pipelines' (MTCs and STCs) synchronous execution. In one example, the uncore may include components such as a collective engine 260, a queue engine 265, an atomic engine 270, and memory engine 275, among other example components and corresponding logic. An example memory engine 275 may provide an internal DMA engine for the architecture. The queue engine 265 can orchestrate and queue messaging within the architecture, with messages optimized in terms of (reduced) size to enable very fast messaging within the architecture. An example collective engine 260 may handle various collective operations for the architecture, including reductions, barriers, scatters, gathers, broadcasts, etc. The atomic engine 270 may handle any memory controller lock scenarios impacting the memory controller 250, among other example functionality.

Figure 2B:
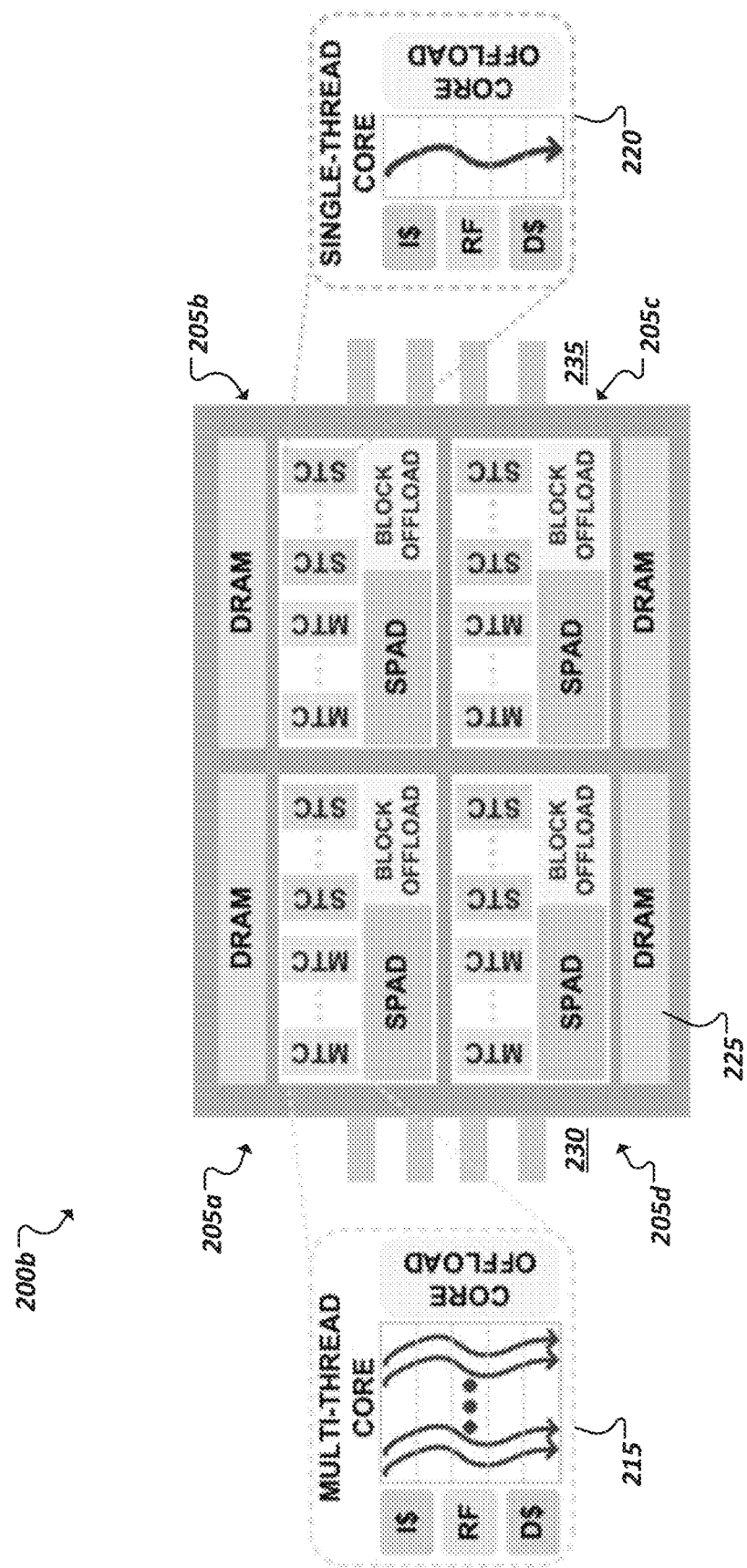
FIG. 2B is a simplified block diagram illustrating an example graph processing device.

FIG. 2B is a simplified block diagram illustrating an example system 200b with a set of graph processing cores 205a-d. A graph processing node may include a respective graph processing core (e.g., 205a-d) and a corresponding memory (e.g., dynamic random access memory (DRAM) (e.g., 225)). Each node may include a respective graph processing core (e.g., 205), which includes a set of MTCs (e.g., 215) as well as a set of single-thread cores (STCs) (e.g., 220), such as in the example graph processing core 205 illustrated and described above in the example of FIG. 2A. In one example, multiple graph processing nodes may be incorporated in or mounted on the same package or board and interconnected via a high-radix (e.g., multiple (e.g., >3) ports per connection), low-diameter (e.g., of 3 or less) network. The example system 200 may further include interconnect ports (e.g., 230, 235) to enable the system 200 to be coupled to other computing elements including other types of processing units (e.g., central processing units (CPUs), graphical processing units (GPUs), tensor processing units (TPUs), etc. In some cases, a graph processing chip, chiplet, board, or device (e.g., system 200) may be coupled to other graph processing devices (e.g., additional instances of the same type of graph processing system (e.g., 200). In some implementations, interconnects 230, 235 may be utilized to couple to other memory devices, allowing this external memory and local DRAM (e.g., 225) to function as shared system memory of the graph processing nodes for use by graph processing cores and other logic of the graph processing nodes, among other examples.

Figure 3A:
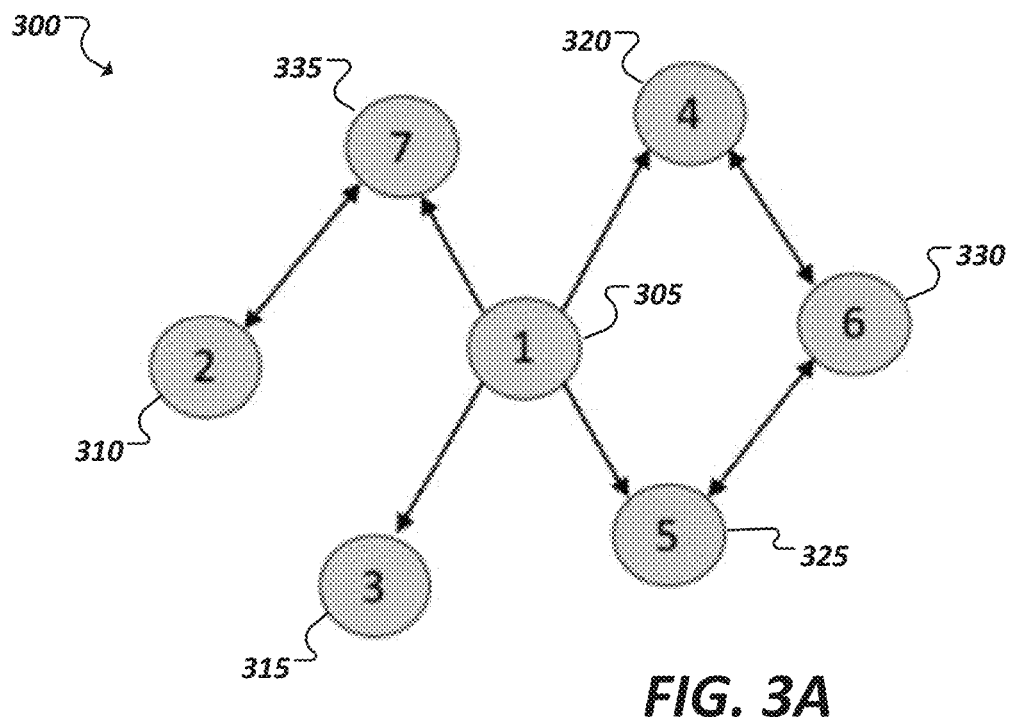
FIG. 3A is a simplified block diagram illustrating a simplified example of a graph structure.
Figure 3B:
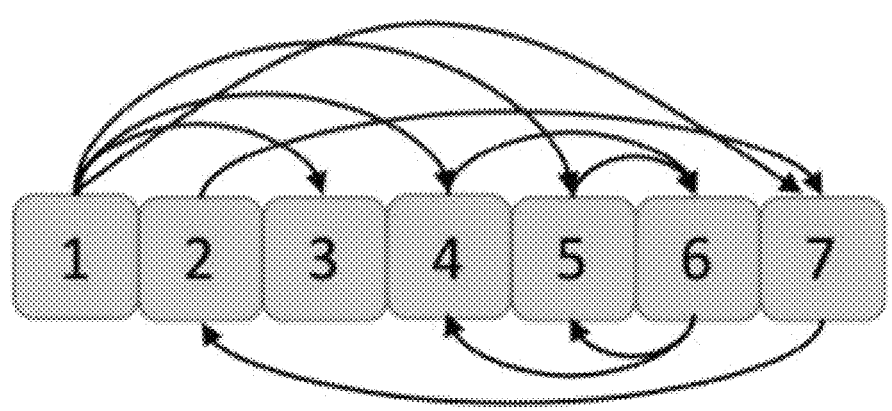
FIG. 3B is a simplified block diagram illustrating a representation of an example access stream using an example graph structure.

FIG. 3A is a simplified representation of an example graph structure 300. The graph structure may be composed of multiple interconnected nodes (e.g., 305, 310, 315, 320, 325, 330, 335). An edge is defined by the interface between one graph node and respective neighboring graph node. Each node may be connected to one or more other nodes in the graph. The sparseness of graph data structures leads to scattered and irregular memory accesses and communication, challenging the decades-long optimizations made in traditional dense compute solutions. As an example, consider the common case of pushing data along the graph edges (e.g., with reference to the simplified graph 300 example of FIG. 3A). All vertices initially store a value locally and then proceed to add their value to all neighbors along outgoing edges. This basic computation is ubiquitous in graph algorithms. FIG. 3B illustrates a representation 350 of an example access stream (e.g., from node 1 (305)), which illustrates the irregularity and lack of locality in such operations, making conventional prefetching and caching effectively useless.

More generally, graph algorithms face several major scalability challenges on traditional CPU and GPU architectures, because of the irregularity and sparsity of graph structures. For instance, in traditional cache-based processor architectures, which utilize prefetching, the execution of graph applications may suffer from inefficient cache and bandwidth utilization. Due to the sparsity of graph structures, caches used in such applications are thrashed with single-use sparse accesses and useless prefetches where most (e.g., 64 byte) memory fetches contain only a small amount (e.g., 8-bytes out of 64) of useful data. Further, overprovisioning memory bandwidth and/or cache space to cope with sparsity is inefficient in terms of power consumption, chip area and I/O pin count.

Further analysis of graph algorithms shows additional problems in optimizing performance. For instance, in the execution of graph algorithms, the computations may be irregular in character—they exhibit skewed compute time distributions, encounter frequent control flow instructions, and perform many memory accesses. For instance, for an example graph-based link analysis algorithm for a search engine, the compute time for a vertex in the algorithm is proportional to the number of outgoing edges (degree) of that vertex. Graphs such as the one illustrated in FIG. 3A may have skewed degree distributions, and thus the work per vertex has a high variance, leading to significant load imbalance. Graph applications may be heavy on branches and memory operations. Furthermore, conditional branches are often data dependent, e.g., checking the degree or certain properties of vertices, leading to irregular and therefore hard to predict branch outcomes. Together with the high cache miss rates caused by the sparse accesses, conventional performance oriented out-of-order processors are largely underutilized: most of the time they are stalled on cache misses, while a large part of the speculative resources is wasted due to branch mispredictions.

As additional example shortcomings of conventional computing architectures' availability to handle graph processing, graph algorithms require frequent fine- and coarse-grained synchronization. For example, fine-grained synchronizations (e.g., atomics) may be required in a graph algorithm to prevent race conditions when pushing values along edges. Synchronization instructions that resolve in the cache hierarchy place a large stress on the cache coherency mechanisms for multi-socket systems, and all synchronizations incur long round-trip latencies on multi-node systems. Additionally, the sparse memory accesses result in even more memory traffic for synchronizations due to false sharing in the cache coherency system. Coarse-grained synchronizations (e.g., system-wide barriers and prefix scans) fence the already-challenging computations in graph algorithms. These synchronizations have diverse uses including resource coordination, dynamic load balancing, and the aggregation of partial results. These synchronizations can dominate execution time on large-scale systems due to high network latencies and imbalanced computation.

Additionally, current commercial graph databases may be quite large (e.g., exceed 20 TB as an in-memory representation). Such large problems may exceed the capabilities of even a rack of computational nodes of any type, which requires a large-scale multi-node platform to even house the graph's working set. When combined with the prior observations—poor memory hierarchy utilization, high control flow changes, frequent memory references, and abundant synchronizations—reducing the latency to access remote data is a challenge, combined with latency hiding techniques in the processing elements, among other example considerations. Traditional architectures and their limitations in being able to effectively handle graph algorithms extends beyond CPUs to include traditional GPU—sparse accesses prevent memory coalescing, branches cause thread divergence and synchronization limits thread progress. While GPUs may have more threads and much higher memory bandwidth, GPUs have limited memory capacity and limited scale-out capabilities, which means that they are unable to process large, multi-TB graphs. Furthermore, where graphs are extremely sparse (<<1% non-zeros), typical GPU memory usage is orders of magnitude less efficient, making GPUs all but unusable outside of the smallest graphs, among other example issues.

An improved computing system architecture may be implemented in computing systems to enable more efficient (e.g., per watt performance) graph analytics. In one example, specialized graph processing cores may be networked together in a low diameter, high radix manner to more efficiently handle graph analytics workloads. The design of such graph processing cores builds on the observations that most graph workloads have abundant parallelism, are memory bound and are not compute intensive. These observations call for many simple pipelines, with multi-threading to hide memory latency. Returning to the discussion of FIG. 2, such graph processing cores may be implemented as multi-threaded cores (MTC), which are round-robin multi-threaded in-order pipeline. In one implementation, at any moment, each thread in an MTC can only have one in-flight instruction, which considerably simplifies the core design for better energy efficiency. Single-threaded cores (STC) are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-or-order pipelines. In some implementations, both MTCs and STCs may implement the same custom RISC instruction set.

Figure 4:
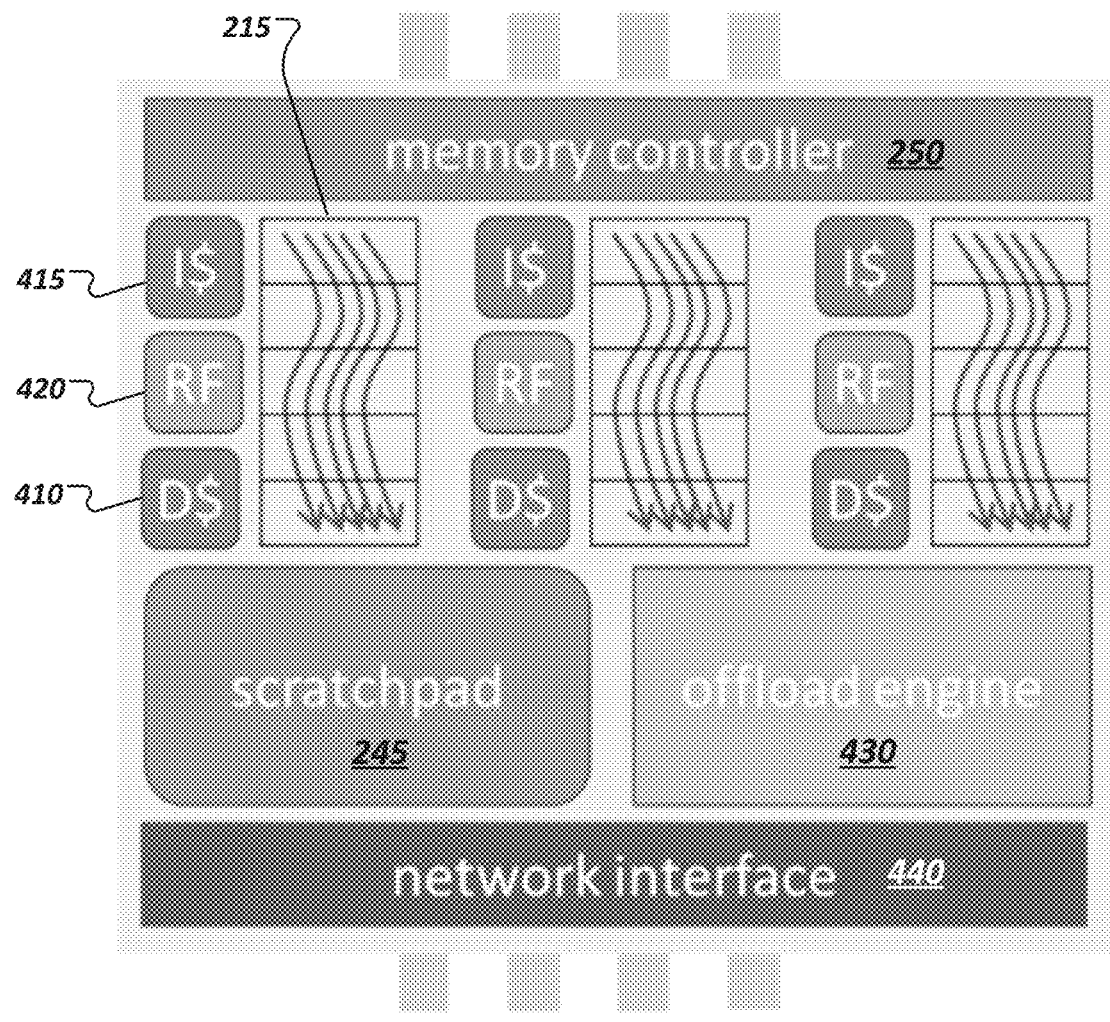
FIG. 4 is a simplified block diagram illustrating example components of an example graph processing core.

Turning to FIG. 4, a simplified block diagram 400 is shown illustrating example components of an example graph processing core device (e.g., 205). A graph processing core device may include a set of multi-threaded cores (MTCs) (e.g., 215). In some instances, both multi-threaded cores and single threaded cores (STCs) may be provided within a graph processing block. Further, each core may have a small data cache (D$) (e.g., 410) and an instruction cache (I$) (e.g., 415), and a register file (RF) (e.g., 420) to support its thread count. Because of the low locality in graph workloads, no higher cache levels need be included, avoiding useless chip area and power consumption of large caches. For scalability, in some implementations, caches are not coherent. In such implementations, programs that are to be executed using the system may be adapted to avoid modifying shared data that is cached, or to flush caches if required for correctness. As noted above, in some implementations, MTCs and STCs are grouped into blocks, each of which may be provided with a large local scratchpad (SPAD) memory 245 for low latency storage. Programs run on such platforms may selecting which memory accesses to cache (e.g., local stack), which to put on SPAD (e.g., often reused data structures or the result of a direct memory access (DMA) gather operation), and which not to store locally. Further, prefetchers may be omitted from such architectures to avoid useless data fetches and to limit power consumption. Instead, some implementations may utilize offload engines or other circuitry to efficiently fetch large chunks of useful data.

Figure 5:
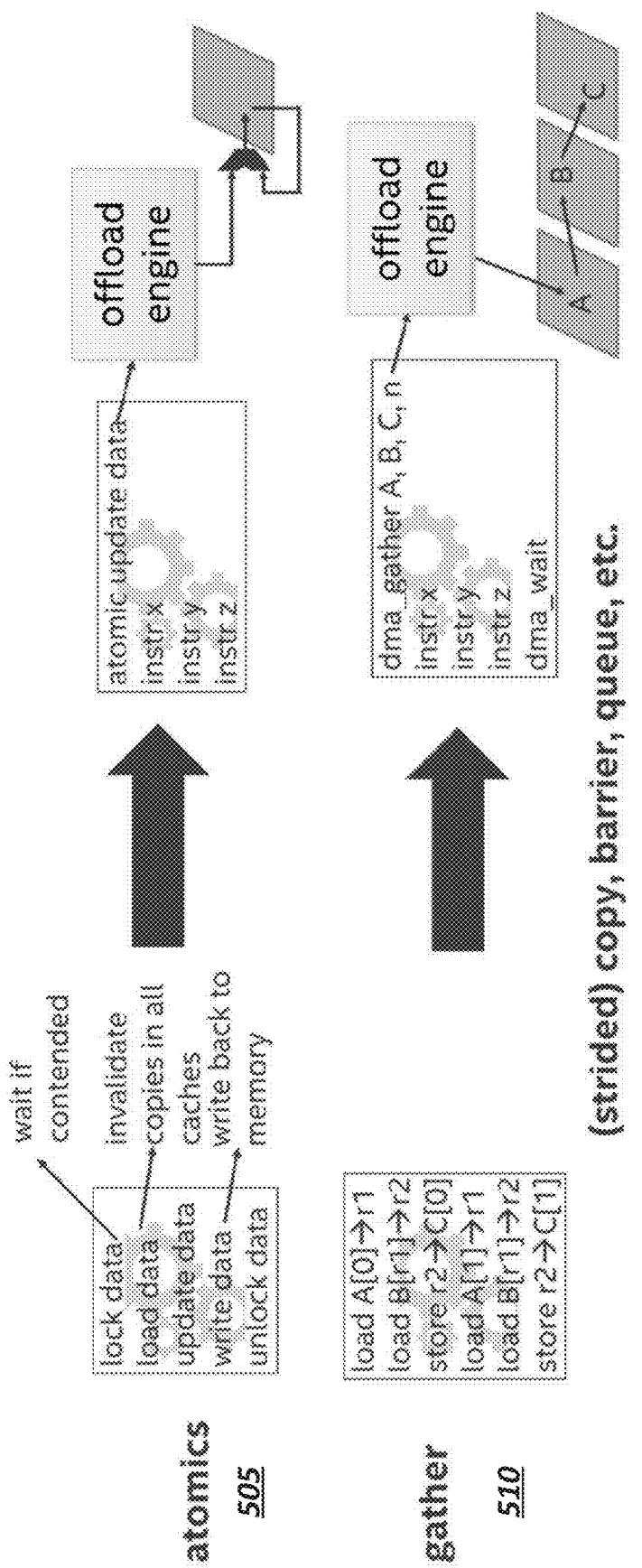
FIG. 5 is a diagram illustrating example operations of an example graphic processing core offload engine.

Continuing with this example, although the MTCs of an example graph processing core hide some of the memory latency by supporting multiple concurrent threads, an MTC may adopt an in-order design, which limits the number of outstanding memory accesses to one per thread. To increase memory-level parallelism and to free more compute cycles to the graph processing core, a memory offload engine (e.g., 430) may be provided for each block. The offload engine performs memory operations typically found in many graph applications in the background, while the cores continue with their computations. Turning to FIG. 5, a simplified block diagram 500 is shown illustrating example operations of an example graphic processing core offload engine (e.g., 430) including atomics 505 and gather operations 510, among other examples. Further, a direct memory access (DMA) engine may perform operations such as (strided) copy, scatter and gather. Queue engines may also be provided, which are responsible for maintaining queues allocated in shared memory, alleviating the core from atomic inserts and removals, among other example benefits. The logic of an offload engine can be used for work stealing algorithms and dynamically partitioning the workload. Further, the offload engines can implement efficient system-wide reductions and barriers. Remote atomics perform atomic operations at the memory controller where the data is located, instead of burdening the pipeline with first locking the data, moving the data to the core, updating it, writing back, and unlocking. They enable efficient and scalable synchronization, which is indispensable for the high thread count in this improved graph-optimized system architecture. The collective logic (or engines) of the offload engines may directed by the graph processing cores using specific instructions defined in an instruction set. These instructions may be non-blocking, enabling the graph processing cores to perform other work while these memory management operations are performed in the background. Custom polling and waiting instructions may also be included within the instruction set architecture (ISA) for use in synchronizing the threads and offloaded computations, among other example features. In some implementations, example graph processing cores and chipsets may not rely on any locality. Instead, the graph processing cores may collectively use their offload engines to perform complex systemwide memory operations in parallel, and only move the data that is eventually needed to the core that requests it. For example, a DMA gather will not move the memory stored indices or addresses of the data elements to gather to the requesting core, but only the requested elements from the data array.

Returning to FIG. 4, an example graph processing device may additionally include a memory controller 250 to access and manage requests of local DRAM. Further, sparse and irregular accesses to a large data structure are typical for graph analysis applications. Therefore, accesses to remote memory should be done with minimal overhead. An improved system architecture, such as introduced above, utilizing specialized graph processing cores adapted for processing graph-centric workload may, in some implementations, implement a hardware distributed global address space (DGAS), which enables respective cores (e.g., graph processing core or support dense core) to uniformly access memory across the full system, which may include multiple nodes (e.g., a multiple graph processing core, corresponding memory, and memory management hardware) with one address space. Accordingly, a network interface (e.g., 440) may be provided to facilitate network connections between processing cores (e.g., on the same or different die, package, board, rack, etc.).

Besides avoiding the overhead of setting up communication for remote accesses, a DGAS also greatly simplifies programming, because there is no implementation difference between accessing local and remote memory. Further, in some implementations, address translation tables (ATT) may be provided, which contain programmable rules to translate application memory addresses to physical locations, to arrange the address space to the need of the application (e.g., address interleaved, block partitioned, etc.). Memory controllers may be provided within the system (e.g., one per block) to natively support relatively small cache lines (e.g., 8 byte accesses, rather than 64 byte accesses), while supporting standard cache line accesses as well. Such components may enable only the data that is actually needed to be fetched, thereby reducing memory bandwidth pressure and utilizing the available bandwidth more efficiently.

Figure 6:
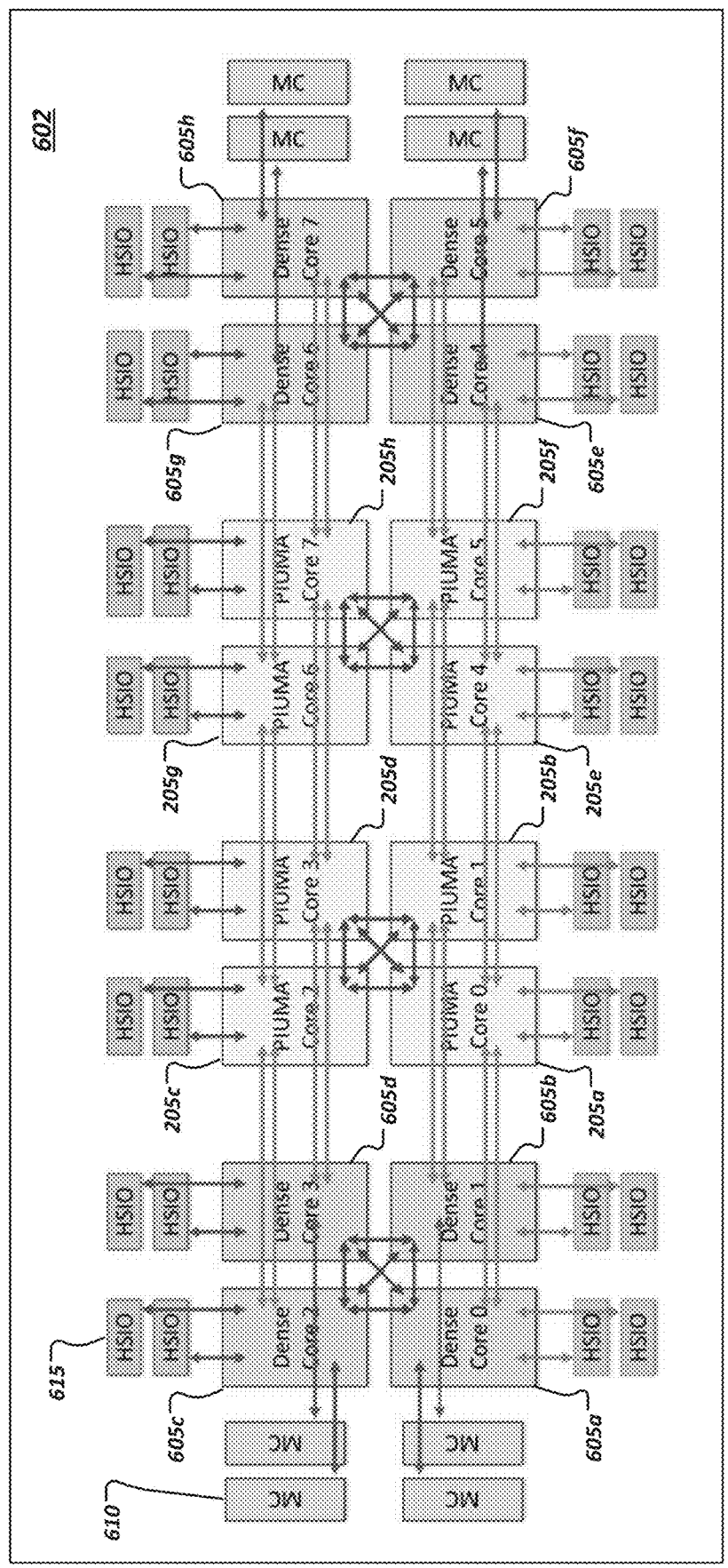
FIG. 6 is a simplified block diagram illustrating an example implementation of a graph processing system including both graph processing cores and dense compute cores.

As noted above, a system, implemented as a chiplet, board, rack, or other platform, may include multiple interconnected graph processing cores, among other hardware elements. FIG. 6 is a simplified block diagram 600 showing an example implementation of a graph processing system 602 including a number of graph processing cores (e.g., 205a-h) each coupled to a high-radix, low-diameter network to interconnect all of the graph processing cores in the system. In this example implementations, the system may further include dense compute cores (e.g., 605a-h) likewise interconnected. In some instances, kernel functions, which would more efficiently be executed using dense compute logic may be offloaded from the graph processing cores to one or more of the dense compute cores. The graph processing cores may include associated memory blocks, which may be exposed to programmers via their own memory maps. Memory controllers (MC) (e.g., 610) may be provided in the system to other memory, including memory external to the system (e.g., on a different die, board, or rack). High speed input/output (HSIO) circuitry (e.g., 615) may also be provided on the system to enable core blocks and devices to couple to other computing devices, such as compute, accelerator, networking, and/or memory devices external to the system, among other examples.

A network may be provided in a system to interconnect the component within the system (e.g., on the same SoC or chiplet die, etc.) and the attributes of the network may be specially configured to support and enhance the graph processing efficiencies of the system. Indeed, the network connecting the blocks is responsible for sending memory requests to remote memory controllers. Similar to the memory controller, it is optimized for small messages (e.g., 8 byte messages). Furthermore, due to the high fraction of remote accesses, network bandwidth may exceed local DRAM bandwidth, which is different from conventional architectures that assume higher local traffic than remote traffic. To obtain high bandwidth and low latency to remote blocks, the network needs a high radix and a low diameter. Various topologies may be utilized to implement such network dimensions and characteristics. In one example, a HyperX topology may be utilized, with all-to-all connections on each level. In some implementations, links on the highest levels are implemented as optical links to ensure power-efficient, high-bandwidth communication. The hierarchical topology and optical links enable the system to efficiently scale out to many nodes, maintaining easy and fast remote access.

Figure 7:
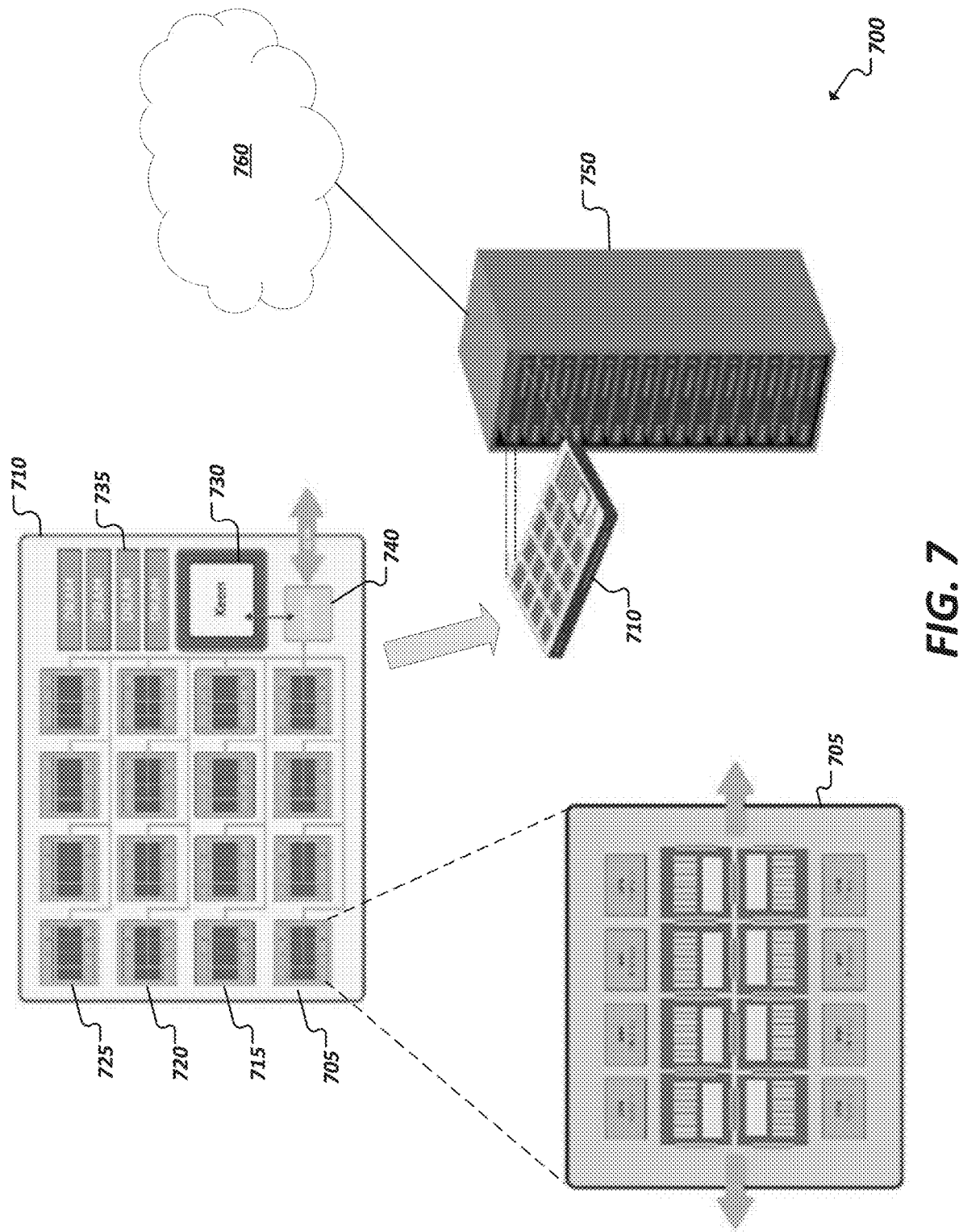
FIG. 7 is a simplified block diagram illustrating an example system.

FIG. 7 is a simplified block diagram showing the use of an example graph processing system (incorporating graph processing cores, such as discussed above) in a server system. A graph processing device (e.g., 705) may be provided with a set of graph processing cores (and in some cases, supplemental dense compute cores). A graph processing device 705 may enable specialized processing support to handle graph workloads with small and irregular memory accesses through near-memory atomics, among other features, such as discussed above. Multiple such graph processing devices (e.g., 705, 715, 720, 725, etc.) may be provided on a board, rack, blade, or other platform (e.g., 710). In some implementations, the platform system 710 may include not only an interconnected network of graph processing devices (and their constituent graph processing cores), but the system 710 may further include general purpose processors (e.g., 730), SoC devices, accelerators, memory elements (e.g., 735), as well additional switches, fabrics, or other circuitry (e.g., 740) to interconnect and facilitate the communication of data between devices (e.g., 705-740) on the platform. The system 710 may adopt a global memory model and be interconnected consistent with the networking and packaging principles described herein to enable high I/O and memory bandwidth.

In some implementations, the system 710 may itself be capable of being further connected to other systems, such as other blade systems in a server rack system (e.g., 750). Multiple systems within the server system 750 may also be equipped with graph processing cores to further scale the graph processing power of a system. Indeed, multiple servers full of such graph processing cores may be connected via a wider area network (e.g., 760) to further scale such systems. The networking of such devices using the proposed graph processing architecture offers networking as a first-class citizen, supports point-to-point messaging, and relies upon a flattened latency hierarchy, among other example features and advantages.

In one example system, a C/C++ compiler (e.g., based on LLVM) may be utilized in the development of software for use with the graph processing systems described herein. For instance, the compiler may support a Reduced Instruction Set Computer (RISC) instruction set architecture (ISA) of the graph processing system, including basic library functions. In some implementations, graph-processing-specific operations, such as the offload engines and remote atomics, are accessible using intrinsics. Additionally, the runtime environment of the system may implement basic memory and thread management, supporting common programming models, such as gather-apply-scatter, task-based and single program, multiple data (SPMD)-style parallelism. Among other tools, an architectural simulator for the graph processing architecture may be provided to simulate the timing of all instructions in the pipelines, engines, memory, and network, based on the hardware specifications. Additional software development tools may be provided to assist developers is developing software for such graph processing systems, such as tools to simulate execution of the software, generate performance estimations of running a workload on the system, performance analysis reports (e.g., CPI stacks and detailed performance information on each memory structure and each instruction), among other example features. Such tools may enable workload owners to quickly detect bottleneck causes, and to use these insights to optimize the workload for graph processing systems.

In some implementations, software developed to perform graph analytics using the improved graph processing architecture discussed herein may be implemented as basic kernels, library overhead may be limited. In networked systems of multiple graph processing cores, the application code does not need to change for multinode execution, thanks to the system-wide shared memory. As an example, a software application may be written to cause the graph processing system to perform a sparse matrix dense vector multiplication (SpMV) algorithm. The basic operation of SpMV may include a multiply-accumulate of sparse matrix elements and a dense vector. A matrix input may be provided (e.g., an RMAT-30 synthetic matrix) stored in compressed sparse row (CSR) format. In one example, a straightforward implementation of SpMV may be programmed, with each thread of the graph processing cores calculating one or more elements of the result vector. The rows are partitioned across the threads based on the number of non-zeros for a balanced execution. It does not make use of DMA operations, and all accesses are non-cached at a default length (e.g., 8-byte), with thread local stack accesses cached by default. Such an implementation may outperform high performance CPU architectures (e.g., Intel Xeon™) through the use of a higher thread count and 8-byte memory accesses, avoiding memory bandwidth saturation. In other implementations of an SpMV algorithm may be programmed to execute on the graph processing architecture utilizing selective caching. For instance, accesses to the matrix values are cached, while the sparse accesses to the vector bypass caches. In the compressed sparse row (CSR) representation of a sparse matrix, all non-zero elements on a row are stored consecutively and accessed sequentially, resulting in spatial locality. The dense vector, on the other hand, is accessed sparsely, because only a few of its elements are needed for the multiply-accumulate (the indices of the non-zeros in the row of the matrix). Accordingly, the accesses to the matrix are cached, while the vector accesses remain uncached 8-byte accesses, leading to a further potential performance improvement relative to CPU architectures. Further, an implementation of the SpMV algorithm may be further enhanced using a graph processing architecture, for instance, by a DMA gather operation to fetch the elements of the dense vector that are needed for the current row from memory. These elements may then be stored on local scratchpad. The multiply-accumulate reduction is then done by the core, fetching the matrix elements from cache and the vector elements from scratchpad. Not only does this significantly reduce the number of load instructions, it also reduces data movement: the index list does not need to be transferred to the requesting core, only the final gathered vector elements. While data is gathered, the thread is stalled, allowing other threads that have already fetched their data to compute a result vector element.

Programs, such as the examples above, may be designed to effectively use the graph processing architecture (e.g., using more than 95% of the available memory bandwidth, while not wasting bandwidth on useless and sparse accesses) and realize potentially exponential efficiency improvement over traditional architectures. Further, the improved graph processing architecture provide much higher thread count support (e.g., 144 threads for Xeon, verses thousands of threads (e.g., 16,000+) in the graph processing core implementation), enabling threads to progress while others are stalled on memory operations, efficient small size local and remote memory operations, and powerful offload engines that allow for more memory/compute overlap. Scaling graph processing systems (e.g., with multiple nodes) may yield compounding benefits (even if not perfectly linear, for instance, due to larger latencies and bandwidth restrictions or other example issues) to significantly outperform other multi-node conventional multinode processor configurations. While the examples focus on an SpMV algorithm, it should be appreciated that this example was offered as but one of many example graph algorithms. Similar programs may be developed to leverage the features of a graph processing architecture to more efficiently perform other graph-based algorithms including application classification, random walks, graph search, Louvain community, TIES sampler, Graph2Vec, Graph Sage, Graph Wave, parallel decoding FST, geolocation, breadth-first search, sparse matrix-sparse vector multiplication (SpMSpV), among other examples.

As noted above, sparse workloads exhibit a large number of random remote memory accesses and have been shown to be heavily network and memory bandwidth-intensive and less dependent on compute capability. While the graph processing architecture discussed herein provides efficient support for workloads that are truly sparse (and may be alternatively referred to as "sparse compute" devices), such a graph processing architecture lacks sufficient compute performance to execute dense kernels (e.g., matrix multiply, convolution, etc.) at needed performance in some applications. Dense kernels are a critical component of many critical compute applications such as image processing. Even with matrix computation units included, a challenge remains of effective integration of dense compute and offloading operations with regards to memory movement, matrix operation definition, and controllability across multiple threads.

Traditional offloading techniques (e.g., for offloading to an on-chip accelerator in an SoC) include memory mapped registers. For instance, the pipeline/core can perform the offload of the computation by writing to memory mapped registers present inside the accelerator. These registers may specify configurations as well as data needed to be used for the computation. This may also require the pipeline to monitor/poll registers if it is not sure that the offload engine is idle. In one example of a graph processing, an enhanced offload mechanism may be used to offload dense compute work from the graph processing cores to dense compute cores. There is a hardware managed queue that stores incoming offload instructions and monitors the current status of the pipeline and launches the instructions sequentially, enabling an easy offload mechanism for the software. Multiple graph processing core threads can each use the dense compute bandwidth of the dense compute cores by calling a new ISA function (e.g., by calling the dense.func) without worrying about the status of the dense core and whether other cores are using the dense core at the same time. The offload instruction can also allow efficient and simple passing of the program counter and operand addresses to one of the dense compute cores as well. The queue gives metrics through software readable registers (e.g., the number of instructions waiting (in a COUNT value)) and can help in tracking average waiting requests and other statistics for any dense core.

As noted above, a graph processing architecture may be particularly suited to operate on sparse workloads exhibiting a large number of random remote memory accesses and that are heavily network and memory bandwidth-intensive and less dependent on compute capability. To efficiently address this workload space, a graph processing architecture has a highly scalable low-diameter and high-radix network and many optimized memory interfaces on each die in the system. While this architectural approach provides efficient support for workloads that are truly sparse, providing a system with graph processing cores alone lacks sufficient compute performance to execute dense kernels (e.g., matrix multiply, convolution, etc.) that may be utilized in some application. To correct this performance gap, some systems incorporating a graph processing architecture may further include dense compute cores in addition to the graph processing cores, such as illustrated in the example of FIG. 6. In this example, eight dense compute cores (e.g., 605*a-h*) are incorporated into each die of a graph processing device (e.g., 602) to be incorporated in a system. In such implementations, kernel functions are offloaded from threads in the graph processing cores (e.g., 205*a-h*) to any dense core 605*a-h* in the system 602 via directed messages.

In one example implementation, the compute capability within each dense core is implemented with a 16×16 reconfigurable spatial array of compute elements or systolic array (also referred to herein as a "dense array (DA)"). In some implementations, the reconfigurable array of compute elements of a dense compute core may be implemented as a multi-dimensional systolic array. This array is capable of a variety of floating point and integer operations of varying precisions. In this example, such an array can, in total, at a 2 GHz operating frequency a single dense core can achieve a peak performance of 1 TFLOP of double precision FMAs. Respective dense cores may have a control pipeline responsible for configuring the DA, executing DMA operations to efficiently move data into local buffers, and moving data into and out of the DA to execute the dense computation. The specific characteristics (e.g., memory locations, compute types, and data input sizes) of the operations vary based on the corresponding kernel. These kernels are programmed by software and launched on the control pipeline at a desired program counter (PC) value.

In some implementations, graph processing cores within a system that also include dense compute cores may include a dense offload queue and corresponding hardware circuitry to perform offloads from the graph processing core to the dense compute core control. This offload pipeline is managed intelligently by hardware managed through the dense offload queues (DOQ) to thereby simplify programmability for the software offloading the dense compute. With full hardware management, there is no need for software to check for the idleness of the dense compute or having to manage the contents and ordering of the queue, among other example benefits. The hardware circuitry managing the DOQs may also handle passing of the required program counter (PC) information, the operand, and the result matrix addresses to the control pipeline in a simple manner, among other example features.

In some implementations, a specialized instruction in the graph processing architecture ISA may be provided as a handle for initiating a request to a dense compute core. For instance, the software may use a dense function ISA instruction (e.g., 'dense.func') to trigger the offloading of a task from a graph processing core to a dense compute core by sending an instruction packet over the network interconnecting the cores from the graph processing core to one of the dense compute cores. The request may include the address of the target dense compute core, which may be used by the network to route the packet to the appropriate dense compute core. The request packet may be received at the dense offload queue (DOQ) corresponding to the targeted dense compute core.

Figure 8:
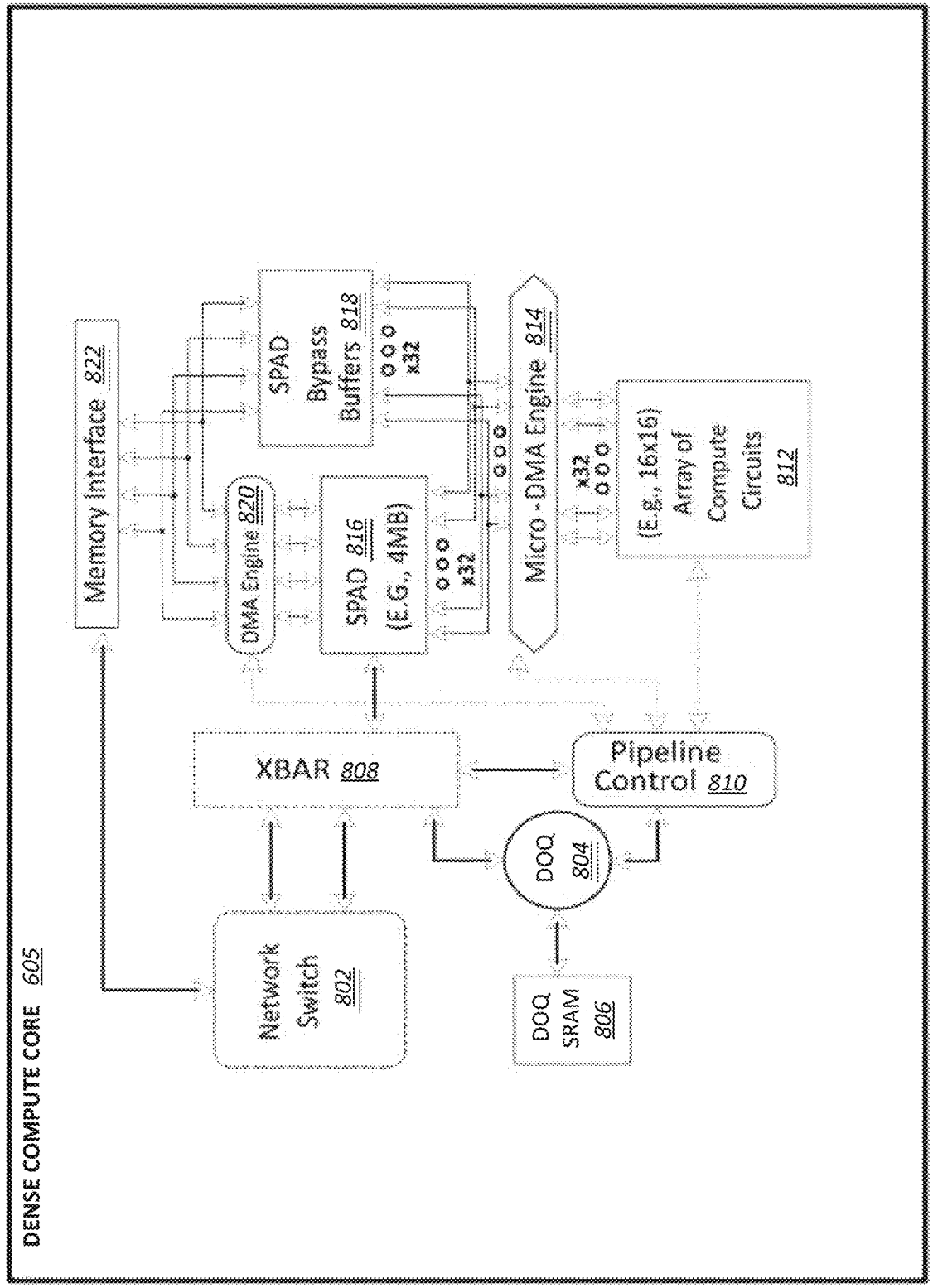
FIG. 8 is a simplified block diagram illustrating an example dense compute core.

Turning to FIG. 8, a simplified block diagram is shown illustrating an example dense compute core 605. Dense compute cores (e.g., 605) may include an array 812 of interconnected compute units, which provide the dense computing functionality of the dense compute core. In some examples, a 16×16 array of compute elements may be provided. A dense compute core 605, in one example implementation, may also include a dense offload queue 804 and control pipeline 810 and crossbar (XBAR) 808 to support the movement of data between the dense compute core and other components of the system (e.g., graph processing cores, memory controllers and associated blocks of shared memory, other dense compute cores, etc.). Logic for executing a dense offload instruction may be implemented as a decoder circuit and/or an execution circuit (e.g., execution unit) in the dense offload queue, the control pipeline, or other components of the dense compute core. Various instructions may be received for a dense computing core at its dense offload queue (e.g., 804).

In some implementations, control pipeline 810 may be implemented as a single-threaded pipeline for managing and orchestrating hardware of the dense compute core 605 for performing various functions. For instance, control pipeline 810 may configure the reconfigurable array of compute elements 812 in one of a variety of possible configurations, read data from local or remote memory (e.g., through DMA calls to shared memory), copy/write such data to local scratchpad memory 816 of the dense compute core for use by the array 812, load instructions corresponding to a set of functions, instructions, kernel, or other program (e.g., based on a program counter value) for execution by compute units in the array, move result data (e.g., data generated during execution of the dense workload offloaded to the dense core) from the dense compute core (e.g., from scratchpad (e.g., 816) to memory accessible to a graph processing core (e.g., through a remote atomic), update registers identifying progress of the workload execution by the array of compute circuits, among other example tasks and functions.

Dense offload queue 804 may be utilized to provide hardware-managed orchestration and monitoring of workloads offloaded to the corresponding dense compute core 605 (e.g., from a sparse-compute graph processing core). The dense offload queue 804 may maintain a hardware-based queue of received instructions, may identify when the control pipeline 810 (and compute array 812) are available to handle a next instruction in the queue, and monitor the status of the control pipeline and performance of functions associated with an offload request. In this manner, the dense offload queue 804 may simplify software development for platforms incorporating a mix of sparse graph processing cores and dense processing cores by implementing the orchestration and monitoring of offloaded dense compute tasks in hardware. For instance, a single instruction (e.g., a dense offload instruction (e.g., dense.func)) may be defined in the ISA of the platform to simply and elegantly allow hardware to manage offloading of tasks and the performance of these tasks by a corresponding dense compute core (e.g., 605). The dense offload queue 804 can cause or launch action by the control pipeline 810 including the performance of actions using in crossbar 808, DMA engine 820, and/or micro-DMA engine 814 to appropriately configure the dense compute core hardware to perform a set of particular tasks, kernel, or other program. In certain embodiments, memory interface 822 is coupled to a (e.g., system) memory, e.g., shared memory external from the dense compute core 605. In certain embodiments, other components (e.g., core(s)) are coupled to core 605 via network switch 802, such as other dense compute cores and graph processing cores, among other example elements.

In certain embodiments, a micro-DMA engine 814 is coupled to the array of compute circuits 812, a scratch pad memory 816 (e.g., memory address accessible), and/or a buffer 818 (e.g., not memory address accessible) that bypasses the SPAD. In one embodiment, local scratchpad (SPAD) 816 is used to hold data that is subject to high reuse and bypass SPAD buffer 818 is used for low-reuse to reduce offload latency. Thirty-two parallel input/output ports are used as an example, and it should be understood that other numbers of ports may be utilized, e.g., 64, 128, etc. In certain embodiments, micro-DMA engine 814 is not coupled to memory external to core 605 and/or is not part of a cache coherency hierarchy.

In some implementations, the array of compute circuits 812 of a dense compute core is implemented as a multi-element (e.g., 16 element×16 element) reconfigurable spatial array of compute circuits (e.g., a dense array (DA)) capable of a variety of floating point and integer operations of varying precisions (e.g., a grid of floating-point unit (FPU) and/or arithmetic-logic unit (ALU) blocks). The reconfigurability of the array of compute circuits 812 allows for multiple options for connectivity between its internal compute circuits. In certain embodiments, the connectivity is pre-configured in the array of compute circuits 212 before (e.g., kernel) execution begins. Embodiments herein utilize a reconfigurable array of compute circuits because (i) given optimal array configuration, it provides high compute efficiency for a subset of kernels under a variety of input and output matrix sizes, and the programmability of the DA (e.g., via the µDMA instructions) seamlessly integrates into an ISA (e.g., an ISA for the second core type) with minimal control pipeline modifications, among other example features and benefits.

Figure 9A:
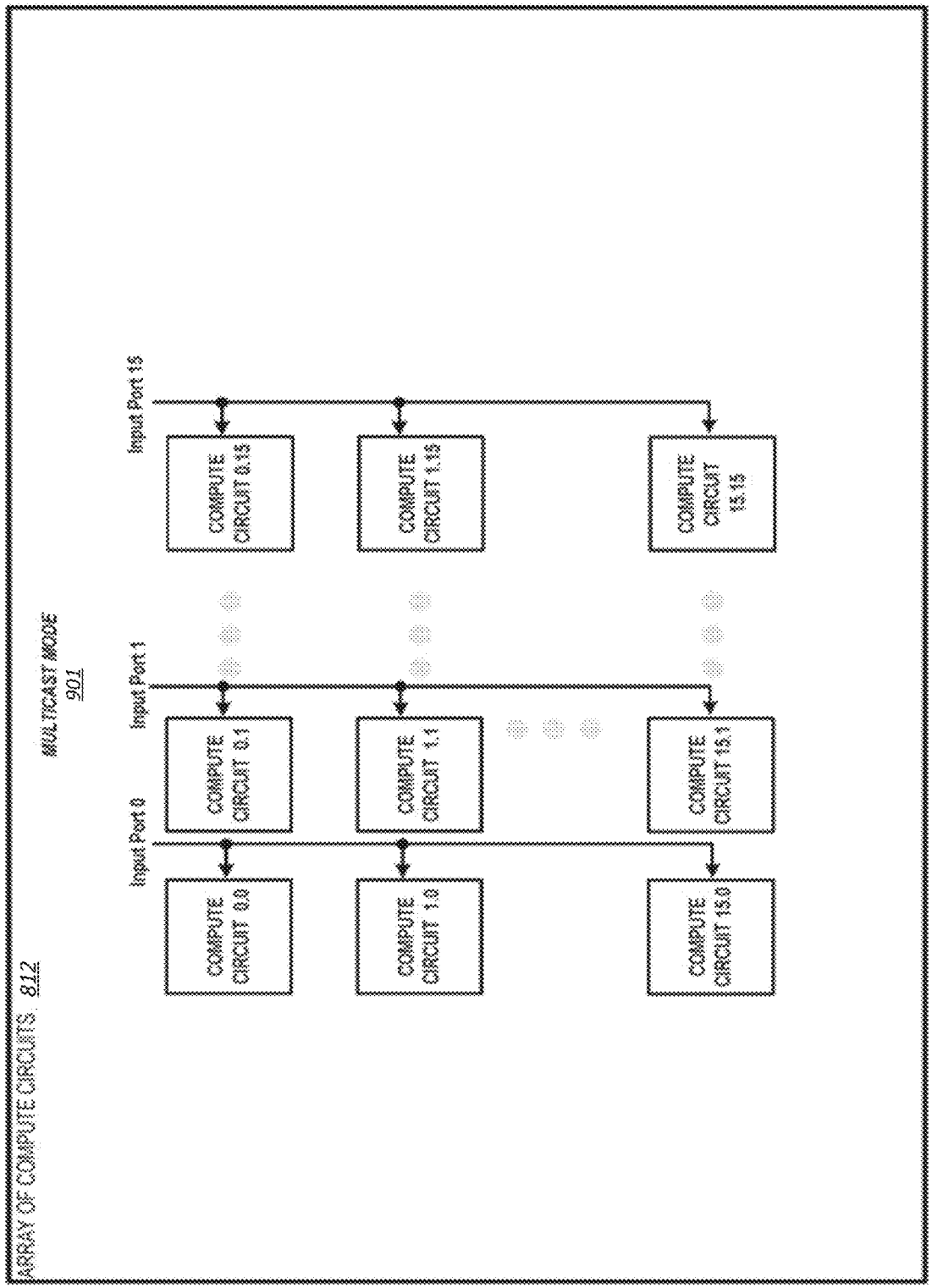
FIGS. 9A-9C are simplified block diagrams illustrates example reconfigurations of a compute array of an example dense compute core.
Figure 9B:
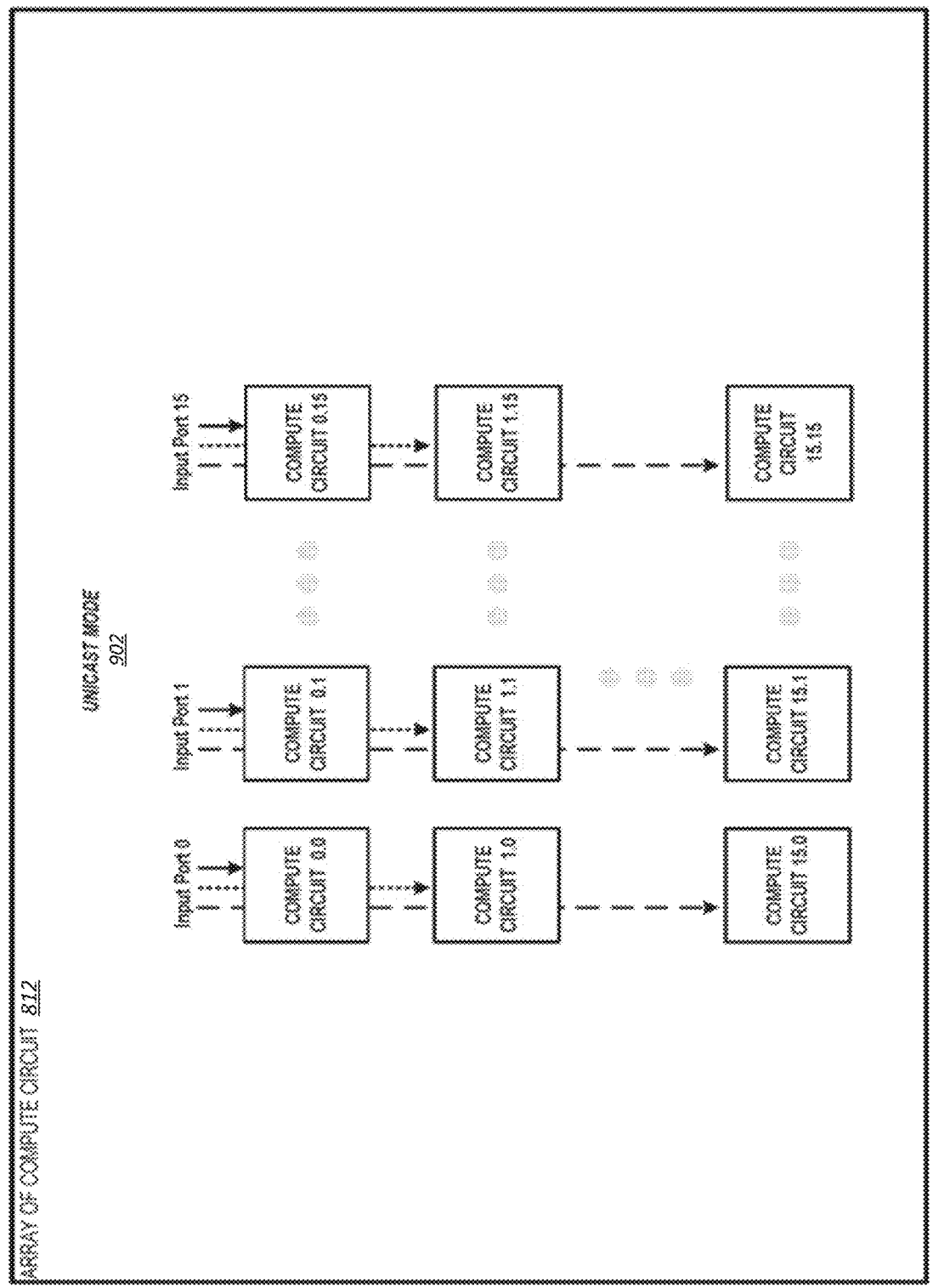
Figure 9C:
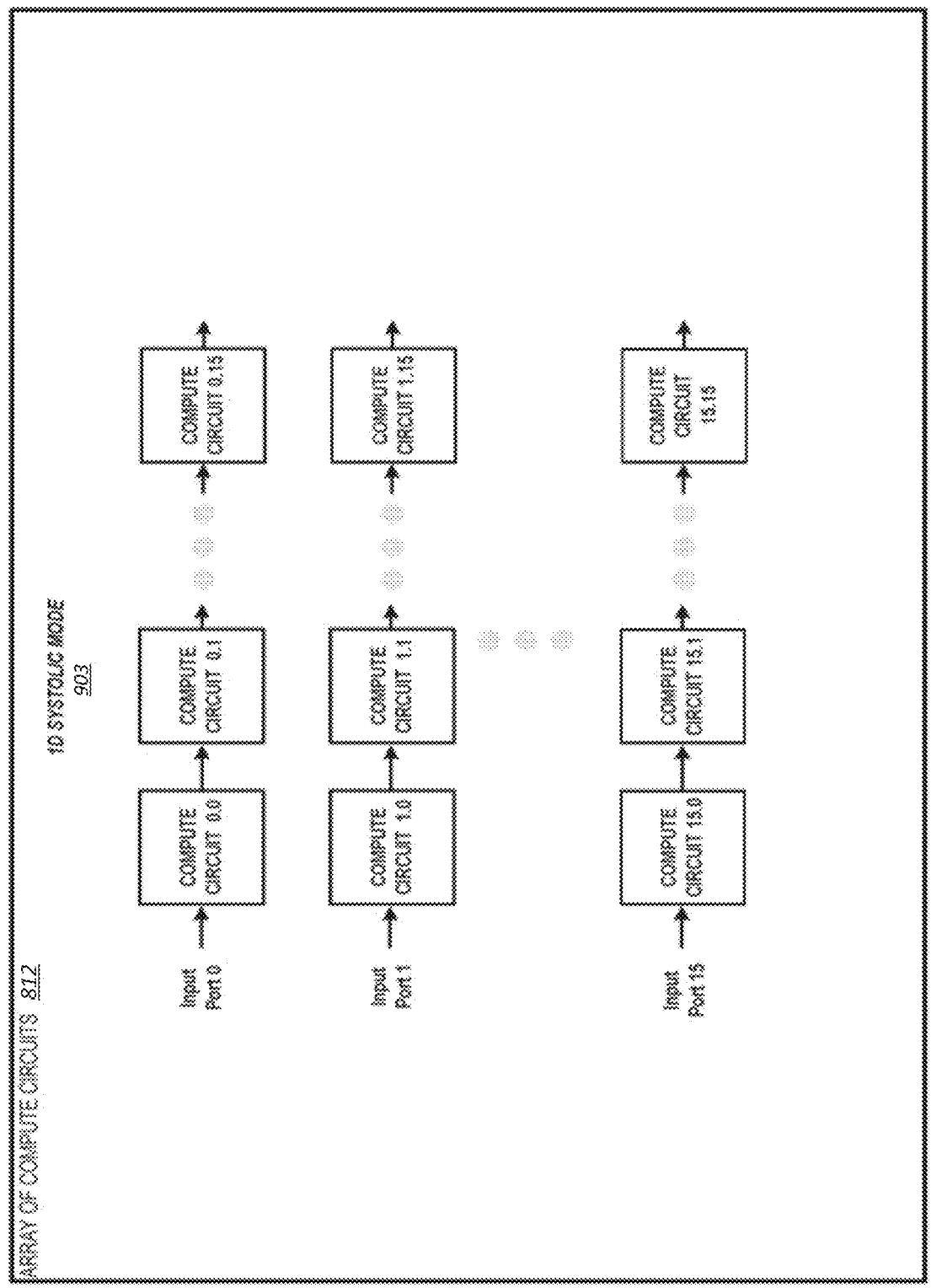

FIGS. 9A-9C illustrate example configurations of an example array of compute circuits, which may be programmed and implemented on an example dense compute core. For instance, FIG. 9A illustrates a block diagram of an array of compute circuits 812 in a multicast mode 901 according to embodiments of the disclosure. As depicted, the compute circuits are each indexed by a value (e.g., between 0 and 15 for each row and each column). In certain embodiments, an array of compute circuits 812 in a multicast mode 301 causes a same value (e.g., from a 1D array of input data) to be broadcast to a proper subset of compute circuits (e.g., shown as entire columns, but entire rows, or a subset of 2D blocks are possible in other embodiments), for example, a first value input to all compute circuits in the first row via input port 0, a second value input to all compute circuits in the second row via input port 1, etc.

FIG. 9B illustrates a block diagram of an array of compute circuits 812 in a unicast mode 902 according to embodiments of the disclosure. In certain embodiments, an array of compute circuits 812 in a unicast mode 902 causes a different value (e.g., from a 2D matrix of input data) to be sent to a respective compute circuits (e.g., shown as being performed on an entire row for each successive operation (e.g., cycle), but entire columns, or a subset of 2D blocks or all compute circuits are possible in other embodiments), for example, a first value input to compute circuit 0.0 in the first row via input port 0, a second value input to compute circuit 0.1 in the second row via input port 1, etc. for a first 1D array of a 2D matrix, then a first value input to compute circuit 0.0 in the first row via input port 0, a second value input to compute circuit 0.1 in the second row via input port 1, etc. for a second 1D array of a 2D matrix, and so forth.

FIG. 9C illustrates a block diagram of an array of compute circuits 812 in a one-dimensional (1D) systolic mode 903 according to embodiments of the disclosure. In certain embodiments, an array of compute circuits 812 in one-dimensional (1D) systolic mode 903 causes a different value (e.g., from a 1D array of input data) to be sent to a respective compute circuits (e.g., shown as being performed on first compute circuits in a first column, but other columns, or rows are possible in other embodiments), for example, a first value input to compute circuit 0.0 in the first column via input port 0, a second value input to compute circuit 1.0 in the first column via input port 1, etc. for a 1D array.

To achieve the optimal combination of ease of programmability and high compute performance through an array of compute circuits, embodiments herein utilize a DMA engine (e.g., micro-DMA engine) to provide the following features: (i) flexibility in the input/output matrix characteristics (e.g., configurability of row and/or column dimensions as well as the organization of the data structure in memory (e.g., row major or column major)), (ii) supporting the method of data movement and memory access patterns for multiple modes of the array (e.g., multicast, unicast, or systolic mode), and (iii) providing high parallelism at each array input/output to hit the highest performance.

The dense offload queue 804 manages incoming dense function requests passed from graph processing cores in a system. For instance, when a dense function request is received, the DOQ 804 will store it in its local memory buffer (DOQ SRAM 806). Whenever the control pipeline 810 has completed execution of the previous kernel and becomes free (or immediately if its already free), the DOQ 804 pops the function from its queue and launches the corresponding thread on the control pipeline 810. Accordingly, in some implementations, the DOQ 804 is responsible for both queue pointer management in the dense compute core, as well as serializing and launching the dense functions in the order that they were received and monitoring the status of the control pipeline 810 to determine when they need to be popped off the queue. Further, the DOG 804 can load the matrix addresses passed along with a dense functional instruction call (e.g., dense.func) into the register file of the control pipeline 810 and thus enables the control pipeline ease of access to this data, among other example functions.

Figure 10:
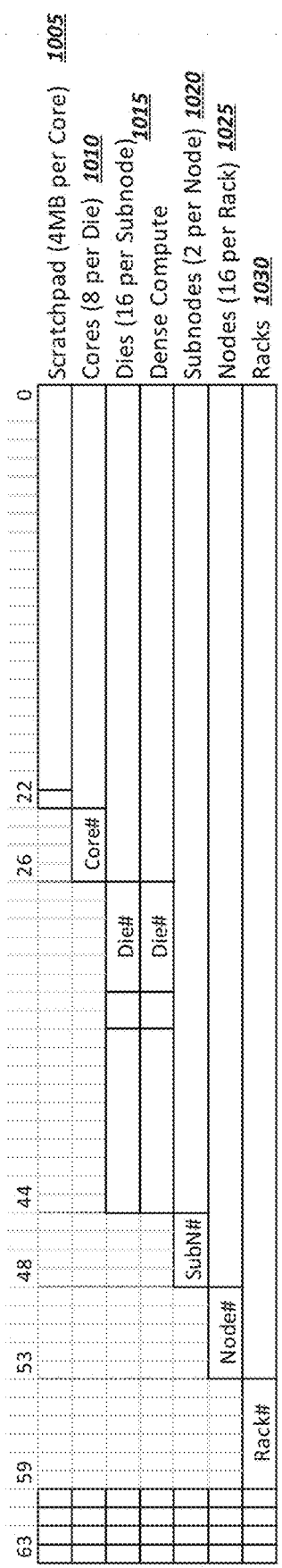
FIG. 10 is a representation of an example memory map of an example graph processing system.

FIG. 10 is a diagram representing an example memory map 1000 utilized in a system including a set of graph processing cores and dense compute cores. Such systems may be further interconnected with other devices (included other instances of similar graph processing devices) in various system topographies. For instance, a first portion 1005 of the memory address space may correspond to a core's local scratch pad, with a second portion 1010 of the memory map dedicated to identifying the specific core (e.g., graph processing core, dense compute core, or other core provided on the system). In one example, eight cores may be provided per die and sixteen dies may be provided per compute sub-node. Accordingly, a third portion 1015 of the memory map may be reserved to address dies (which may be addressed differently between graph processing dies and dense compute dies) and a fourth portion 1020 reserved for subnode addressing. In some implementations, two or more subnodes may be provided per node and nodes may be interconnected on a server rack. Still further, multiple server racks may be interconnected in a network to further expand the overall graph compute capacity of a system, and so on. As illustrated in FIG. 10, corresponding portions (e.g., 1025, 1030) may be provided for addressing at the node, rack, and even system levels, among other examples corresponding to other network topologies.

Figure 11:
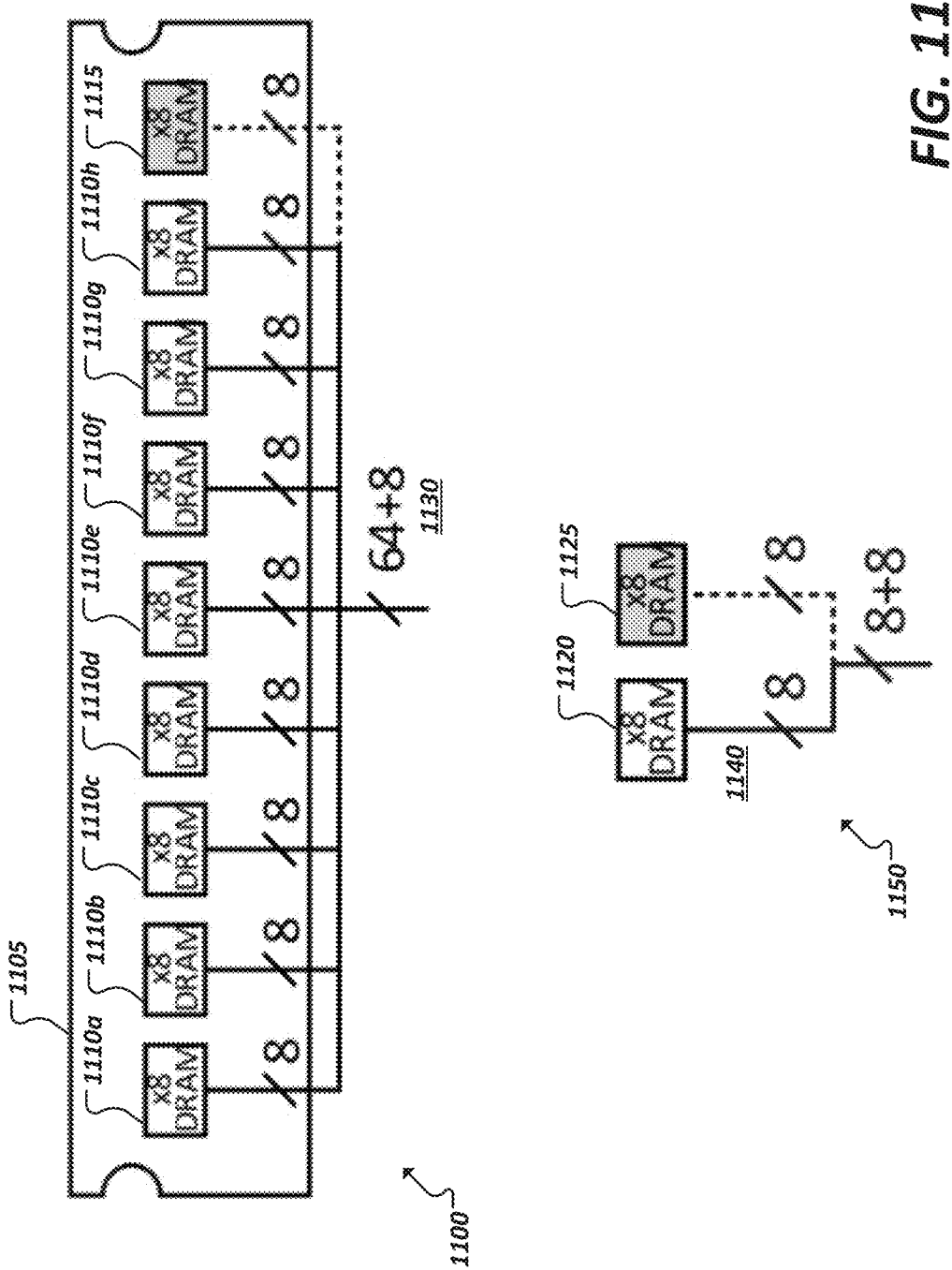
FIG. 11 are simplified block diagrams illustrating error correction in example memory systems.

Error correction code (ECC)-based protection is an important feature in modern memory systems, such as Dual In-line Memory Modules (DIMM), particularly in latency-sensitive systems and applications. Retries and critical errors may result from bit errors present in memory transactions, among other issues. ECC-protection allows for the presence of bit errors to be not only detected, but also automatically corrected. To enable ECC in a traditional memory channel, a dedicated parity device may be provided to implement and store ECC bits associated with a memory transaction on the memory channel. For instance, FIG. 11 illustrates an example 1100 memory device utilizing a traditional memory channel 1130, such as a wider-width 64 bit memory channel to access an array of 8-bit random access memory elements (e.g., 1110*a-h*). In this example, an additional memory element 1115 and corresponding 8-bits in the memory channel may be provision to implement ECC for the channel. In this case, there are 8 transactional data devices (e.g., 1110*a-h*) and 1 parity device 1115, resulting in an ECC overhead for the channel of 12.5%, which is a widely accepted ECC overhead in traditional memory channels and system architectures utilizing such systems. As introduced above, some improved and specialized computing architectures, may utilize narrower memory channels, including the graph processing core-based architectures discussed above. For instance, a narrow 8-bit memory channel 1140 may be provided in another memory system 1150 to couple to a single memory 8-bit memory element 1120. In such examples, and other systems employed narrower memory channels (e.g., narrower than 64-bits), an 8-bit or similar ECC code results in a comparatively higher overhead. For instance, if an 8-bit ECC is employed on the 8-bit narrow memory channel of a graph processing core or other device, the overhead becomes 100% (e.g., through the provision of an additional memory element 1125 to implement the ECC for the channel 1140) which may be considered prohibitively high.

Figure 12:
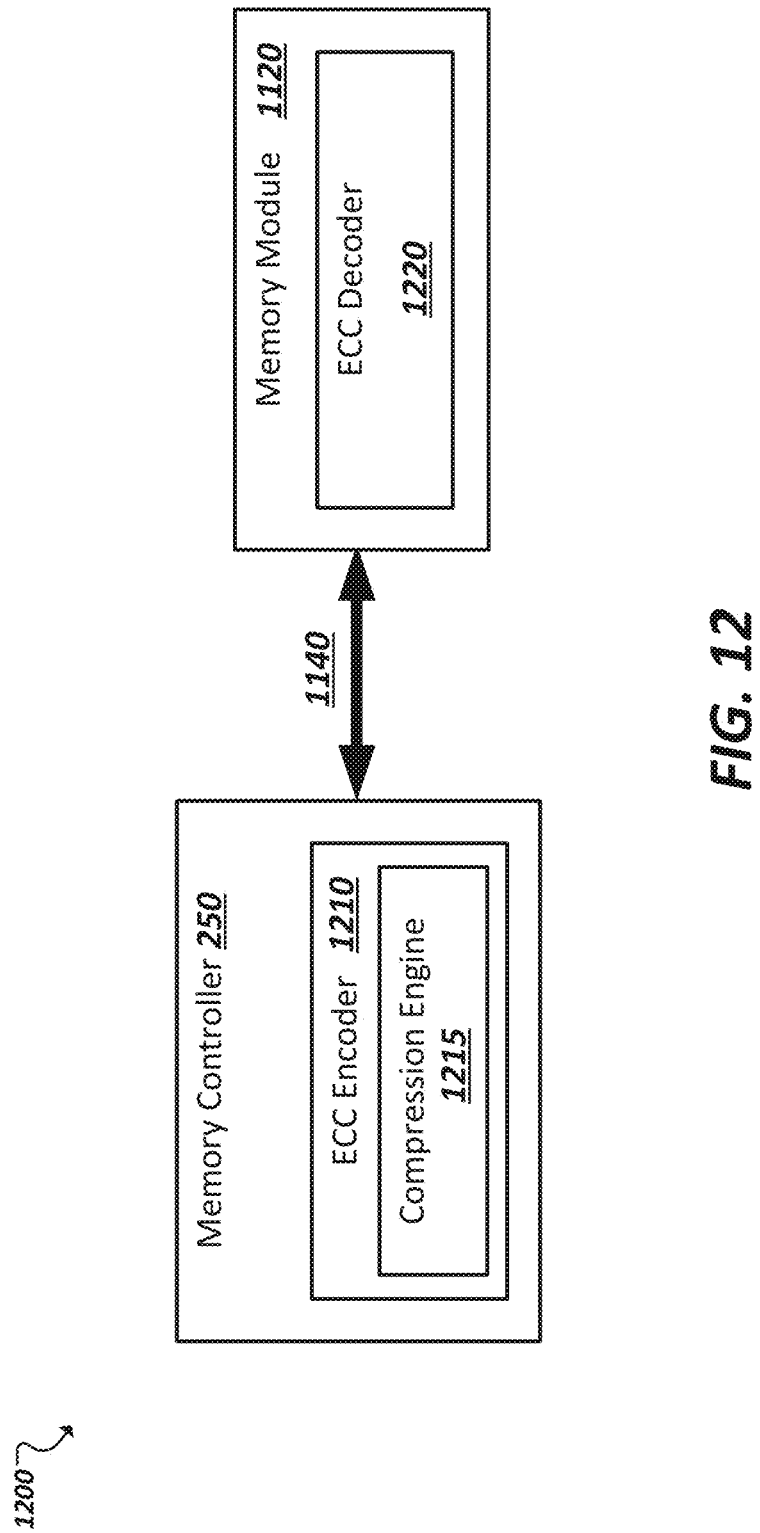
FIG. 12 is a simplified block diagram illustrating an example memory system.

In traditional systems utilizing narrow memory channels, an 8-bit or other ECC code which results in high ECC overhead may require ECC information to always be sent as an additional transaction after the data (the ECC protects) is sent on the channel. As a result, in such implementations, every data transfer results in two back-to-back memory transactions, resulting in a 50% reduction in memory bandwidth. Turning to FIG. 12, in an improved system, an enhanced ECC encoder 1210 and decoder 1220 may be provided to minimize the sending of ECC information in separate data transfers on a narrow memory channel. For instance, FIG. 12 is a simplified block diagram 1200 illustrating an example memory controller 250 (e.g., of a graph processor core or other computing core) coupled to a memory module 1120 by a narrow (e.g., 8-bit, 16-bit, or 32-bit) memory channel 1140. The memory controller 250 may send a number of signals to the memory module 1120 to perform memory access requests, e.g., reads or writes to the memory of the memory module 1120, and the signals may be transmitted over a number of buses including a command/address (CA) bus on which a command type (e.g., read vs. write) may be indicated, a chip select (CS) bus, and a data bus on which data read or written is transmitted between the memory controller 250 and the memory module 1120, among other examples. While the overall width of the bus may incorporate the non-data channels (e.g., the command/address bus), when referring to the narrowness of the memory channel, reference is made to the width of the data bus (e.g., for a memory module 1120 with a x8 DDR5 memory, the memory channel has an 8-bit wide data bus (and will be considered in these examples to have an 8-bit "memory channel width")).

In the example of FIG. 12, memory controller 250 may be provided with improved ECC encoder 1210 logic (e.g., implemented in hardware circuitry) to encode memory requests for the memory module 1120 to be provided with ECC protection. Accordingly, a corresponding ECC decoder block 1220 (e.g., implemented in hardware circuitry) may be likewise provided on the memory module 1220. For instance, the ECC decoder 1210 and decoder 1220 may enable at least some memory requests to be modified to include an ECC without sending the ECC in an additional transfer (e.g., using more bits than is defined for a typical memory request over the memory channel 1140). For instance, out of an 8 B (64-bit) data transfer, 1 B (8-bt) of the data may be checked against a pre-defined pattern to determine whether a portion of the data transfer may be compressed (e.g., using a compression engine 1215 on the memory controller 250). If that 1 B "compression window" matches the pattern, the 1 B can be used to store the ECC information in place of the original data (as it is known), which is to be removed/compressed from the transfer (e.g., memory request). For data that has a high alignment to the pre-defined pattern at the specific 1 B window comparison window, only one memory transaction needs to be sent to include both the substantive information for the memory request as well as full ECC coverage. Such alignment may be leveraged in situations where data has a high degree of pattern commonality, such as memory addressing locations that typically have the MSB bytes as all zeros, or floating-point numbers that have LSB typically as all zeros, among other examples. In such instances, improved ECC encoding/decoding may employed such as discussed herein to achieve significant bandwidth improvements while maintaining a minimum width memory channel (e.g., 8-bit corresponding to an 8-bit DIMM element). Accordingly, no additional memory elements or memory channel width would be needed in such implementations to offer ECC protection for the channel, among other example benefits and advantages over prior solutions.

Figure 13:
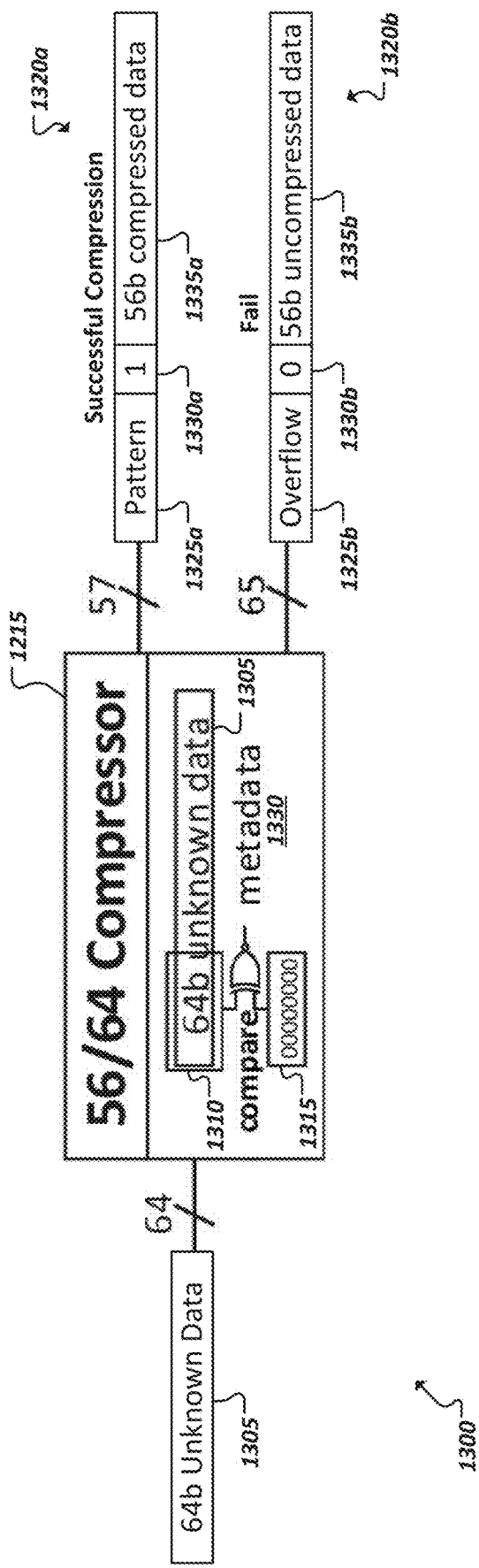
FIG. 13 is a simplified block diagram illustrating example compressor circuitry associated with an error correction code encoder.
Figure 14:
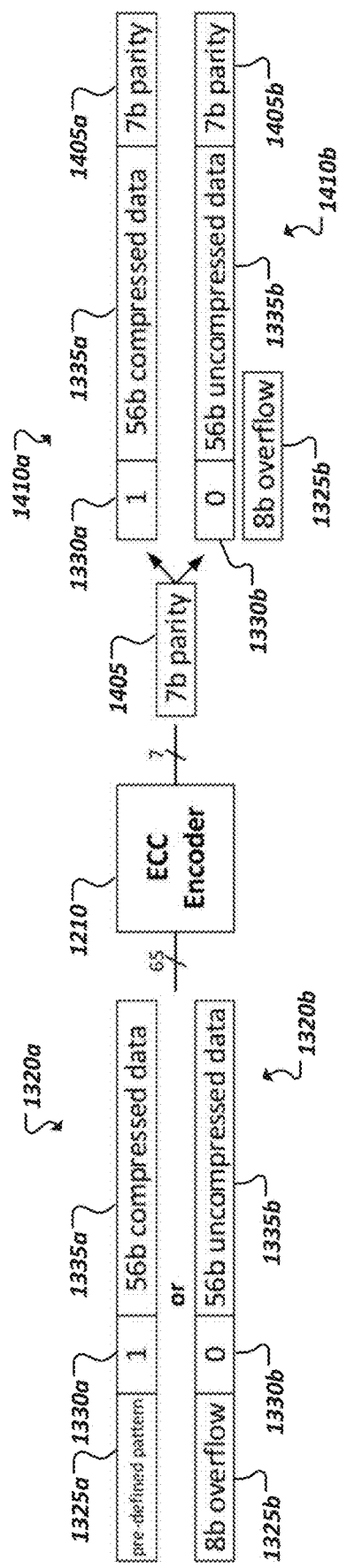
FIG. 14 is a simplified block diagram illustrating an example error correction code encoder.

Turning to FIGS. 13 and 14, simplified block diagram 1300, 1400 are shown illustrating an example implementation of an enhanced ECC encoding technique performed by improved encoder logic of a memory controller (e.g., a memory controller of an associated compute core). The enhanced ECC encoding can include an attempting compression of the memory request to find space in the memory request to include ECC bits. Accordingly, a compression technique may be utilized to pack both data and parity into a single 8-byte memory request without an additional parity device. It should be appreciated that a variety of different compression techniques may be employed, from the simplified compression techniques discussed below (by way of illustrative example), to more complex compression techniques that result in the removal of some number of bits from an original version of a request to allow for ECC bits to be incorporated in the request. For instance, as shown in FIG. 13, a block of data 1305 embodying a memory request (or other defined memory transaction) may be received for encoding. A portion of the memory request 1305 may be mapped to a defined comparison window (e.g., 1310) used by the compression engine 1215 and is compared to a pre-defined comparison pattern 1315 of the same length as the comparison window. The defined comparison window and pre-defined pattern may be defined based on a statistical analysis of data within a system to identify statistically significant occurrence of a particular bit sequence within a relatively high percentage of data block at the location corresponding to the comparison window. Different comparison window locations and patterns may be selected based on the specific data in a specific system so as to achieve a high rate of successful compression (e.g., the more blocks of data include the pattern at the location defined by the comparison window, the more blocks of data (e.g., memory requests) may be compressed to allow for the inclusion of ECC information). Indeed, a system may continuously monitor data in memory requests within the system to identify statistically significant patterns included in memory request and identify corresponding comparison windows and patterns that might applied by the compression engine 1215 to increase the frequency with which compression might be employed, among other example features. Opportunities to supplement the available comparison window-predefined pattern combinations used by the compression engine may be thereby identified to supplement or modify (even dynamically) the comparison window-predefined pattern combinations used by the compression engine 1215, among other examples.

In one example, for the compression, 8 bits of the data in the compression widow 1310 are compared to the pre-defined pattern 1315. In one example, the compression window 1310 may align with the 8 most significant bits (MSB) in the data block 1305 and pattern 1315 may be an 8-bit block of all zeroes (e.g., based on the prevalence of such a pattern included in the MSBs of data within the memory system). To indicate the success of the compression, a metadata bit 1330 is introduced. If the compression is successful where the 8-bit compression window 1310 of the proposed memory request 1305 are matched to the pre-defined pattern 1315, the metadata bit 1330 is set to "1" and the 8 bits of the memory request corresponding to the compression window 1310 are discarded from the memory request 1305 in the compression. The output (e.g., 1320a) of the compression includes the insertion of the metadata bit 1330a (e.g., with a value "1" indicating that compression was successful with the pattern 1325a (which matches the compression window bits in the original data block 1305) and the remaining, "compressed" bits 1335a of the data block 1305. This output (e.g., 1320a) is to be provided as the input for decoding by the decoder block (discussed below). On the other hand, if the compression fails (because the bits in the compression window 1310 do not match the pattern 1315, the 8 bits of the compression window may be instead considered, or allocated, as "overflow" bits. An ECC may be included within the resulting uncompressed memory request (e.g., where these overflow bits were originally located in the data block 1305), but including the ECC results in the overflow bits being excluded from the memory request, where these overflow bits would be transmitted in a separate data transfer to allow all of the information of the request to be transmitted to the memory module, among other example implementations.

Turning to FIG. 14, a simplified block diagram 1400 is shown illustrating the encoding of a memory request from the output (e.g., 1320a, 1320b) of an example compression engine 1215, such as presented in the example of FIG. 13. Depending on the result of the compression (e.g., successful or failed), the corresponding output (e.g., 1320a or 1320b respectively) is provided at an ECC encoder block 1210. When compression fails, the output (e.g., 1320b) includes a metadata bit 1330b set to "0" to indicate that compression failed; when successful the output (e.g., 1320a) includes a metadata bit 1330a set to "1" to indicate successful compression. In this example, a 65-bit compression output is provided to the encoder 1210 to determine, from the compression output, an ECC value for the corresponding memory request, such as a 7-bit parity value 1405. This parity value 1405 (or ECC information) can be inserted into the request data to take the place of either the pattern bits 1325a, where compression was successful, or the overflow bits 1325b, where compression was unsuccessful, to form a 64 bit memory request, which includes the parity value 1405. The overflow bits 1325b may be stored or queued to be sent separately from the encoded memory request (e.g., 1410b) so as to allow the corresponding parity value (e.g., 1405b). Indeed, the ECC information (e.g., 1405a-b) is encoded in the resulting memory request (e.g., 1410a,

1410*b*) along with the metadata bit (e.g., 1330*a*, 1330*b*), and remaining compressed or uncompressed data (e.g., 1335*a*, 1335*b*). The 64-bit memory request (e.g., 1410*a*, 1410*b*) may then be sent over the memory channel to the memory model for decoding and consumption in accordance with the contents of the request.

The metadata bit indicator is provided to alert the memory module whether overflow data (corresponding to a failed compression) is to be received in a separate transaction so as to obtain all of the information for the memory request. In some implementations, the overflow is stored in the memory space reserved for ECC, allowing the compression ratio of 56/64 to keep the same overhead (e.g., 12.5%) as that of single error correction/double error detection (SECDED) implementations. However, unlike traditional SECDED implementations, where 8 bits are used for the parity, only 7 bits are available in this example for the parity after the compression because the compression introduces one additional bit to store meta data. Thus, in this example the codeword in the proposed ECC contains only 7-bit parity not 8-bit.

Figure 15A:
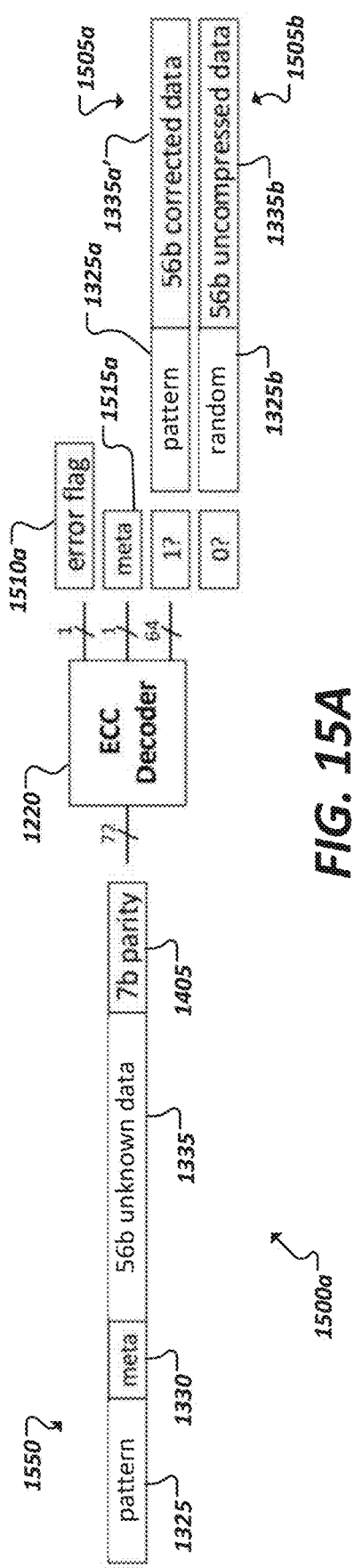
FIGS. 15A-15B are simplified block diagrams illustrating example decoding of an example memory request.
Figure 15B:
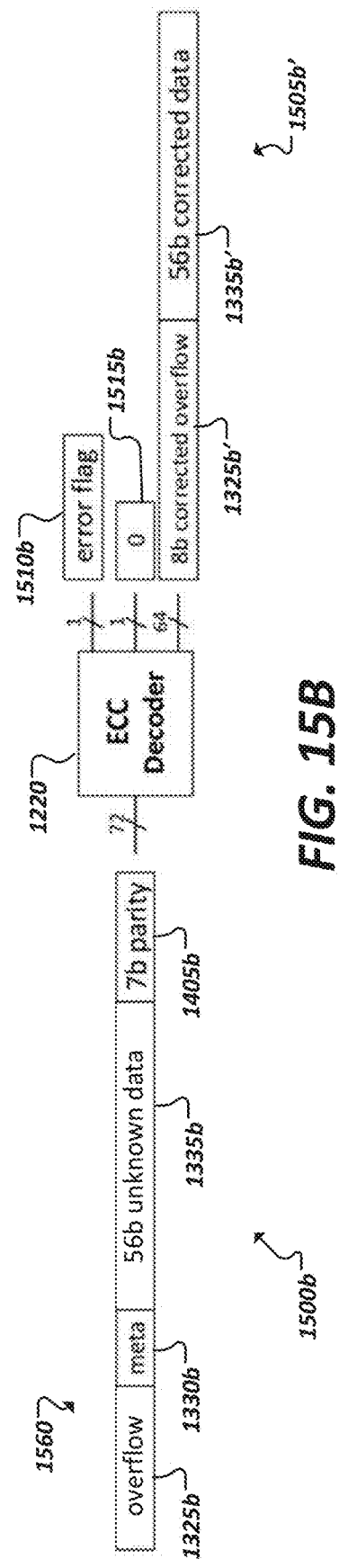

FIGS. 15A-15B are simplified block diagrams 1500*a-b* illustrating the example decoding of a memory request, which includes embedded ECC information (e.g., 7-bit parity), such as generated by the example encoder of examples illustrated and discussed in FIGS. 13 and 14. In this example, the decoder circuitry 1220 may take, as an input, a 72-bit value, which is constructed by concatenating the pre-defined pattern 1325 used by the compression engine (and known to both the memory controller and memory module) to the received, 64-bit memory request to build input 1550. The decoder 1220 is unaware of the contents of the received memory request when it is first received and may first proceed under the assumption that the memory request is compressed and that the addition of the pre-defined pattern 1325 merely restores the request to its pre-compressed state. This assumption is made based on the possibility that a bit error has flipped the metadata bit 1330 when received at the memory interface.

Figure 18A:
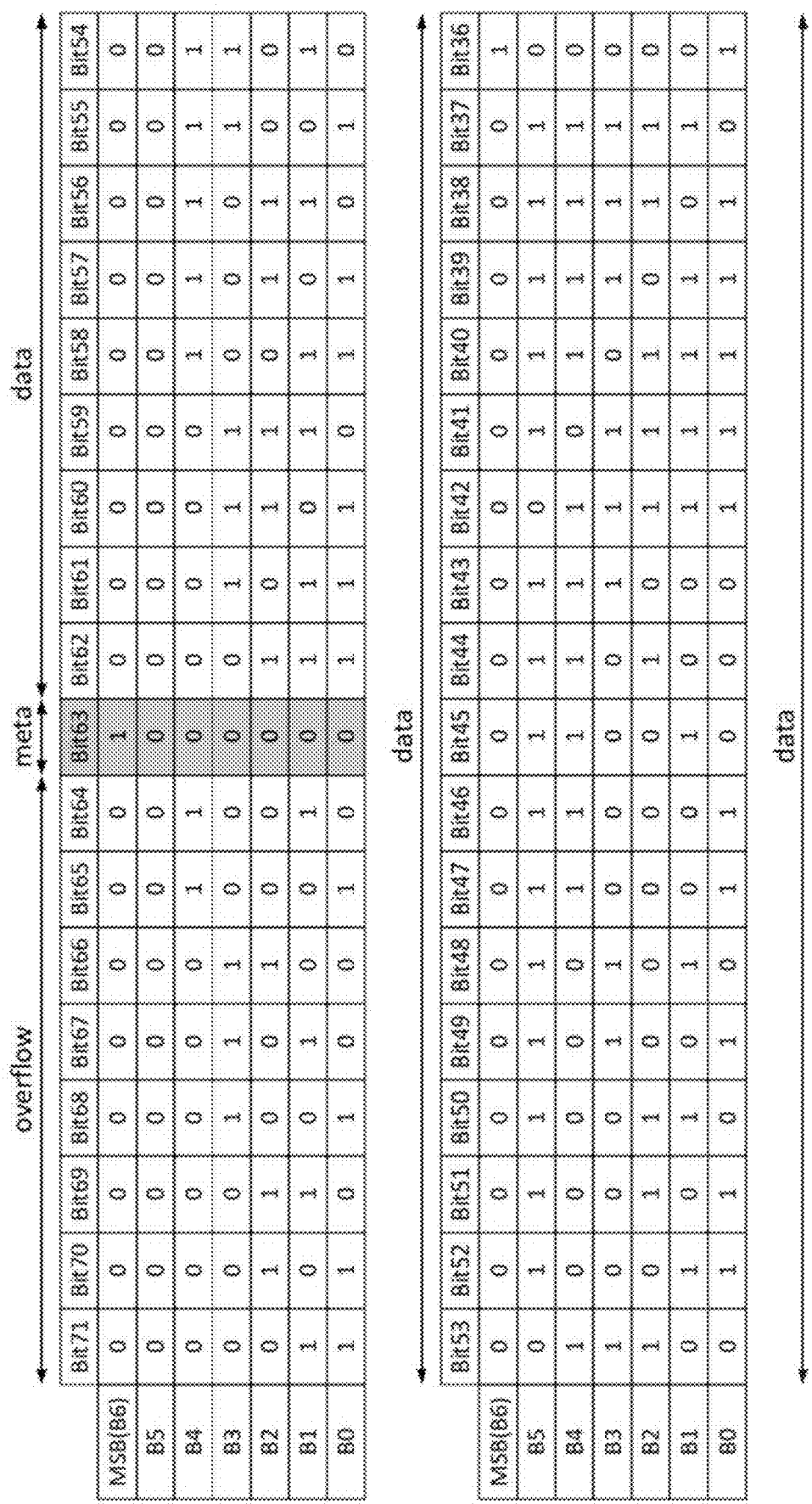
FIGS. 18A-18B illustrate an example H-matrix.
Figure 18B:
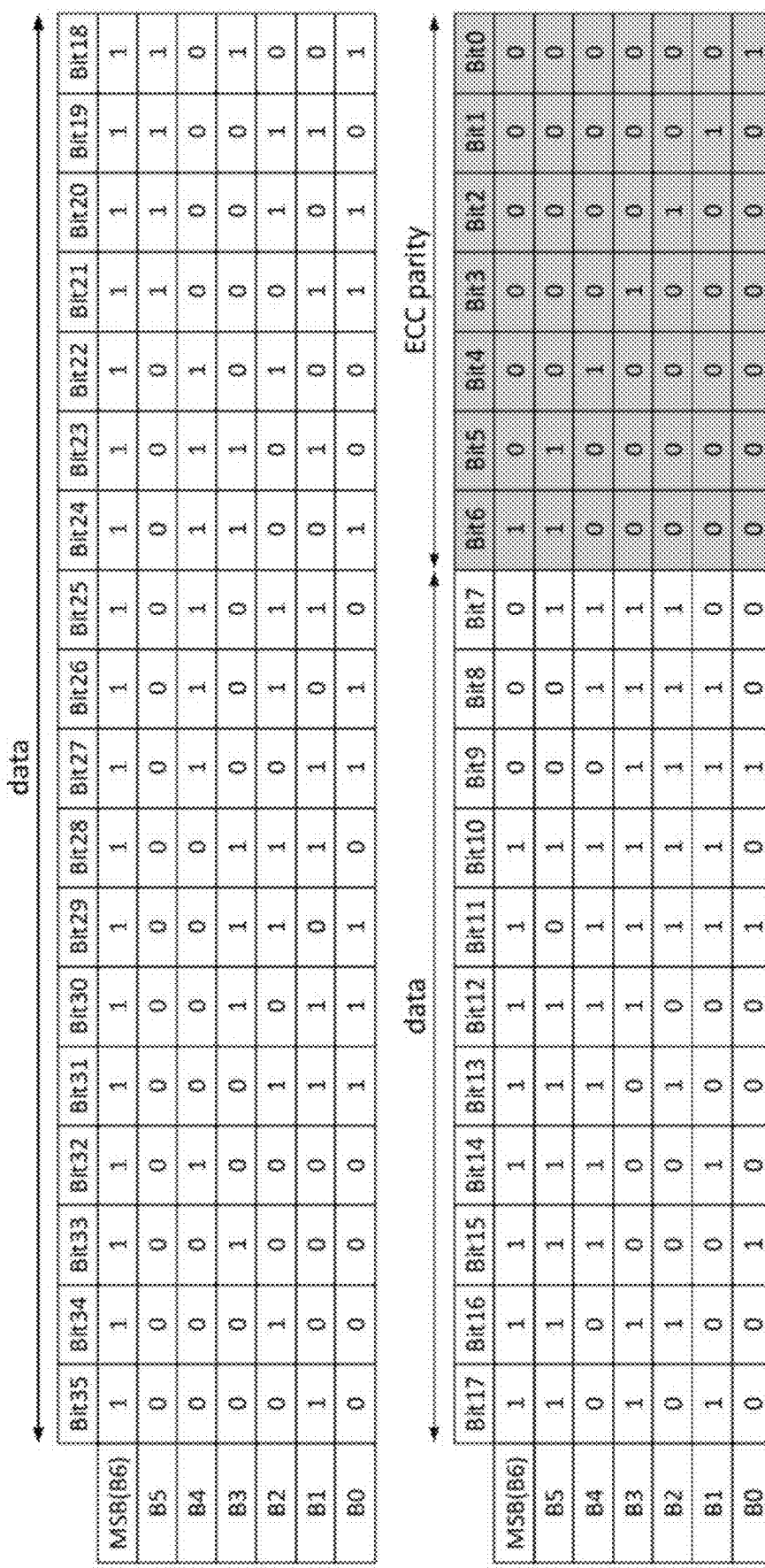
Figure 19:
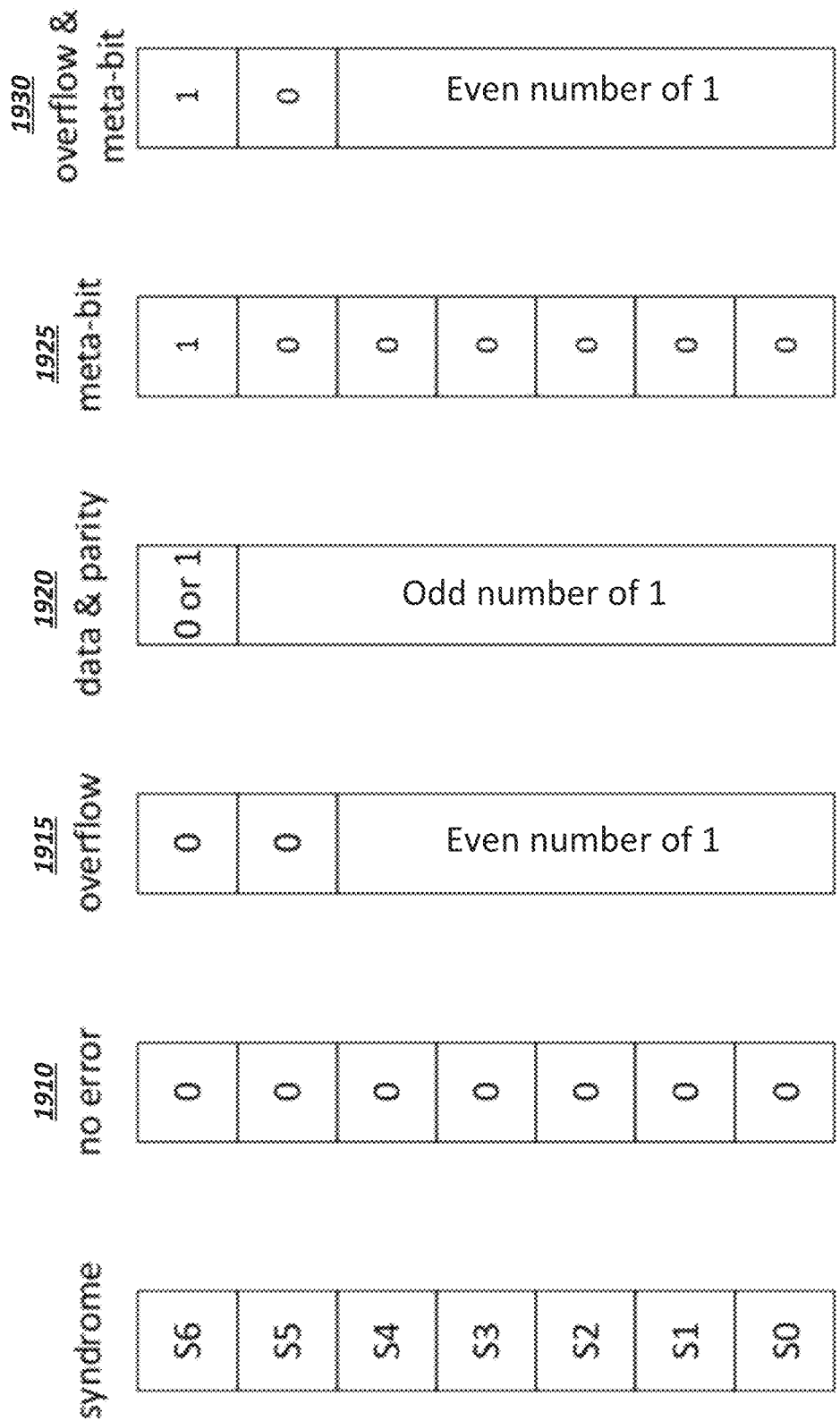
FIG. 19 illustrates example syndrome values associated with the H-matrix in the example of FIGS. 18A-18B.

Given the importance of the metadata bit and its trustworthiness in the operation of an enhanced ECC decoder capable of implementing the algorithms discussed in the examples herein, in some implementations, the ECC information may be designed so as to provide extra protection for the metadata bit and guarantee the ability of the ECC decoder 1220 to accurately identify any bit error affecting the metadata bit and perform the necessary correction so that the ECC decoder 1220 may appropriately identify whether compression has been applied to the data it is decoding and handle the decoding appropriately. FIGS. 18A-18B and 19 present examples of one example for constructing H-matrixes, syndromes, etc. to ensure the correctability of the metadata bit 1330 at the decoder 1220.

Continuing with the example of FIGS. 15A, the decoder 1220 may receive the unknown data block 1550 and perform an initial decoding of the data block 1550, including the detection and correction of bit errors in the data block based on the incorporated ECC information 1405. The decoder 1220 may verify or correct the value of the metadata bit to determine whether the data block 1550 incorporates a compressed memory request (e.g., 1505*a*) or an uncompressed memory request (e.g., 1505*b*). If the data is originally compressed, the decoder can detect and correct a single error. However, if the data is originally uncompressed, the mismatch between the original overflow and the pre-defined pattern creates the false error detection. Although this mismatch can generate up to 8-bit error, the proposed ECC can filter out the false error detection by the mismatch. For instance, by identifying the metadata bit value 1515*a*, the decoder can determine whether the errors are legitimate (e.g., of the memory request is a compressed memory request) or the byproduct of the false assumption that the memory request was compressed by removing the pre-defined pattern (rather than (to the decoder) a random overflow bit sequence. If the decoder 1220 determines, through this first decoding, that the memory request is an uncompressed memory request, the decoder 1220 can identify that corresponding overflow bits belong to the memory request and should be included in an input to the decoder 1220 so as to yield an accurate decoding based on the included parity bits 1405 (which were generated based on the inclusion of those overflow bits being included in the memory request). Accordingly, the decoder 1220 may perform a second round of decoding for uncompressed memory requests.

Turning to FIG. 15B, a simplified block diagram 1500*b* illustrates the performance of a second decoding, when an uncompressed memory request is received. After performing an initial decoding, as in the example of FIG. 15A, the decoder 1220 may determine whether the input 1550 it decoded included a compressed or uncompressed memory request. In the case of a compressed memory request, the addition of pattern 1325 data to form the input 1550 from the received request (e.g., formed of fields 1330, 1335, 1405) was appropriate and the decoder result (e.g., 1505*a*) may be considered successful and accurate, and the decoder 1220 may accept the detection of any errors as valid, may correct any such errors, and provide the decoded request (e.g., 1325*a* with 1335*a*' to derive the original version of the request) for processing at the memory module (e.g., in accordance with a memory transaction corresponding to the memory request). However, if the decoder 1220 identifies (from the corrected metadata bit 1515*a*) that the memory request, as received, is uncompressed, the decoder can access (via an additional 8-bit memory transfer over the memory channel) the overflow bits (e.g., 1325*b*) of the uncompressed request and build another version of the input 1560 for the uncompressed request (e.g., including 1330*b*, 1335*b*, 1405*b*), this time with the received overflow bits 1325*b*, instead of the assumed pre-defined pattern bits (e.g., 1325 in input 1550). The results (e.g., 1505*b*', 1510*b*, etc.) of this second decoding may be trusted as accurate and a corrected version 1505*b*' of the uncompressed memory request may be derived by the decoder 1220 including the corrected overflow data 1325*b*' and remaining data 1335*b*', corrected accurately based on the ECC information 1405*b* included in the memory request.

As should be appreciated by the above example, compression failures in the proposed ECC encoding/decoding technique result in additional overhead due to the resulting additional memory transfer of corresponding overflow bits. Accordingly, configuration of the appropriate comparison window and comparison data (e.g., predefined pattern) may be deliberately to maximize the likelihood that any given memory request handled by the memory controller and memory module will be compressible. While some of the examples and illustrations herein show the comparison window as contiguous bits or even a full byte within the data, it should be appreciated that a comparison window, in other implementations, may be defined, non-contiguous partial bytes or bits within the data, among other examples.

Figure 16A:
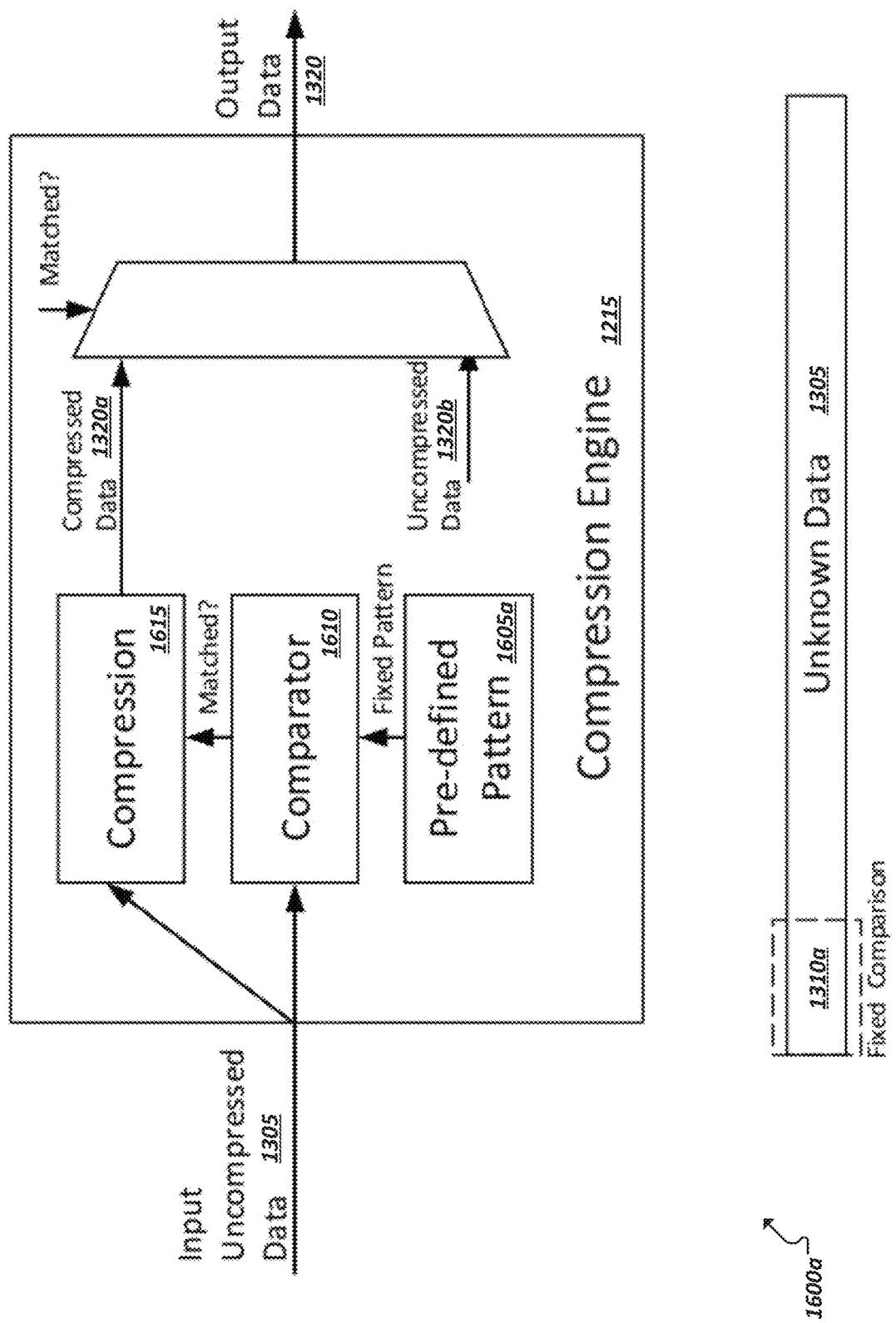
FIGS. 16A-16B are simplified block diagrams illustrating example compression engines.

FIG. 16A illustrates a simplified block diagram 1600*a* showing a first example of a compression engine 1215 that uses a defined comparison window (e.g., 1310*a*) and predefined pattern 1605a as the basis of a compression of a memory request (e.g., similar to the example shown and discussed in FIG. 13). In the example of FIG. 16A, a single, "fixed" compression window and pattern are defined for use by the compression engine 1215. Accordingly, for any uncompressed input data 1305, the comparison window 1310a may be identified in the input data 1305 and the value within that comparison window may be compared (e.g., by comparator circuitry 1610) with the predefined pattern 1605a. If the input data's comparison window matches the predefined pattern, then the input data 1305 may be compressed (e.g., by compression circuitry 1615) to generate compressed data 1320a. If there is not a match with the predefined pattern, compression is unavailable for the input 1305 data, resulting in uncompressed data 1320 being provided for an output 1320 of the compression engine 1215. While, in general, the pre-defined pattern may be determined based on it being the most frequent pattern based on statistical analysis. However, given unknown or random/semi-random input data, it may be unrealistic to achieve high compression success rates with the fixed matching pattern. Indeed, real-world datasets may include a variety of different data types and content, such that a fixed comparison window and/or fixed comparison pattern may not be ideal and shrink the compression success rate, thereby resulting in more double-transfers to obtain the corresponding overflow bits and increasing the ECC overhead in such example implementations.

Figure 16B:
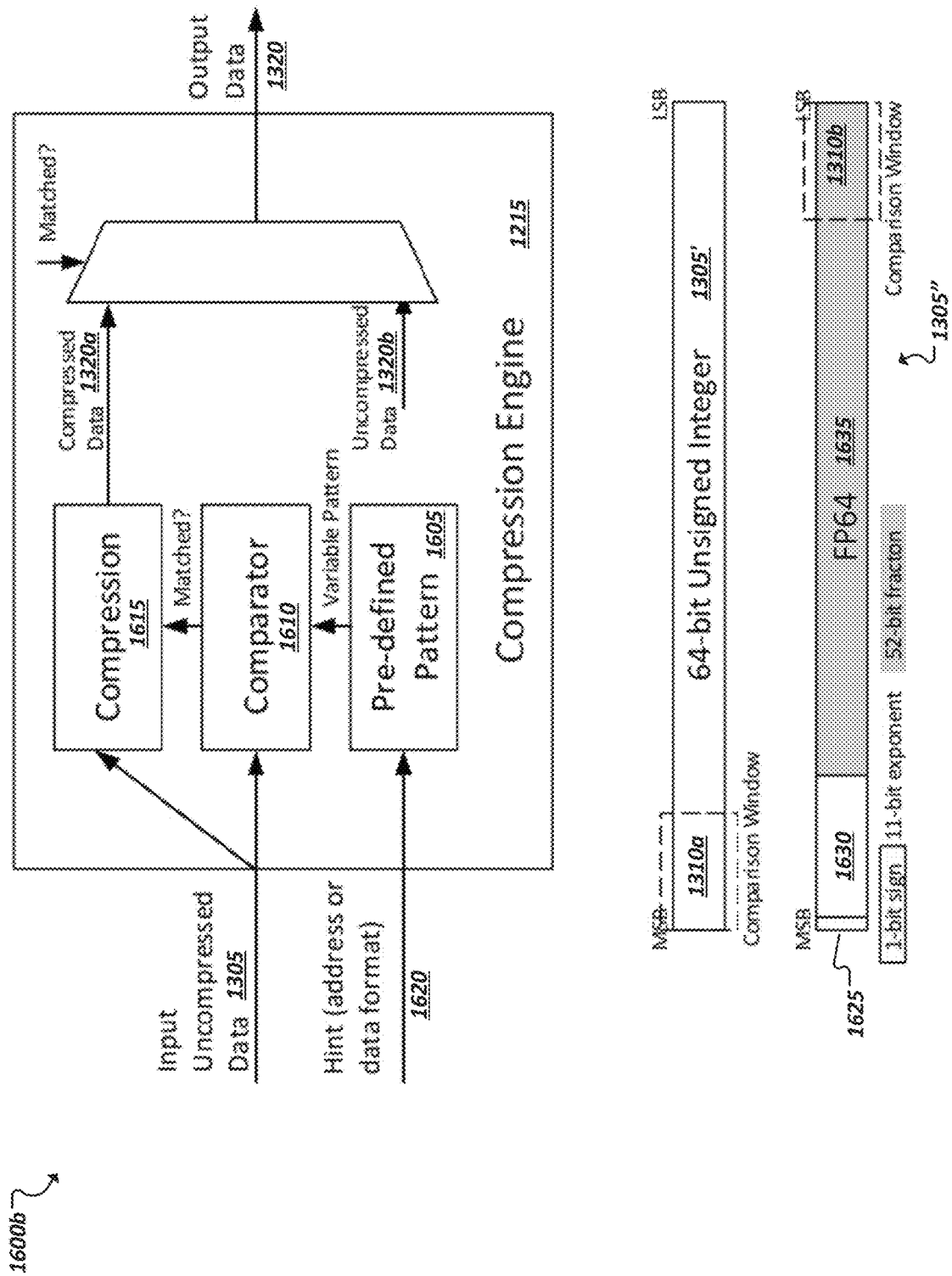

Turning to FIG. 16B, another version of an example compression engine is illustrated by simplified block diagram 1600b. In this example, rather than a fixed comparison window and comparison pattern being defined for all input data 1305, multiple defined comparison window-comparison pattern combinations may be pre-defined and selectable for use by the compression engine 1215 to increase the compression success rate for various different types of uncompressed input data 1305. In one example, multiple comparison window-comparison pattern combinations may be defined to correspond to different data types of messages to be sent to a memory module. In one example, a first comparison window 1310a may be defined to be compared against a first comparison pattern (e.g., all 0s) for input data with an unsigned integer data type, while a second comparison window 1310b is defined to be compared against a second comparison pattern (e.g., all 0s) for input data having 64-bit floating point data type. For example, if the input data is identified to UNIT64, we can expect that MSB-side bits are mostly zero because they are non-zero only for the very big integer number. On the other hand, if the input data is FP64, all-zeros are unlikely in MSB because these bits are dedicated to sign 1625 and exponent bits 1630, which will present as consecutive zeroes for only very small positive numbers, making the use of comparison window 1310a less successful for floating point inputs. Instead, for floating point inputs, many zeros may be expected in the LSB-side bits (corresponding to comparison window 1310b) because they are non-zero only for high precise numbers. Because of the different characteristics of the data formats, if the data format is known, the different patterns can be applied to achieve higher compression success rate. Increasing compression success translates to increased memory performance, among other example benefits.

In the example of FIG. 16B, to select between the use of multiple different comparison window-comparison pattern combinations (e.g., 1310a, 1310b), hint information 1620 may be additionally provided to the compression engine 1215 to identify which comparison window to use for the present or upcoming input data 1305. In some implementations, the hint 1620 for the comparison window can be obtained from the instructions corresponding to the data transaction, from which such information as data type or source/destination address may be obtained, among other examples. In other implementations, a configuration register may be programmably configured (e.g., by system software) to toggle between comparison window selections, among other example implementations.

Figure 17:
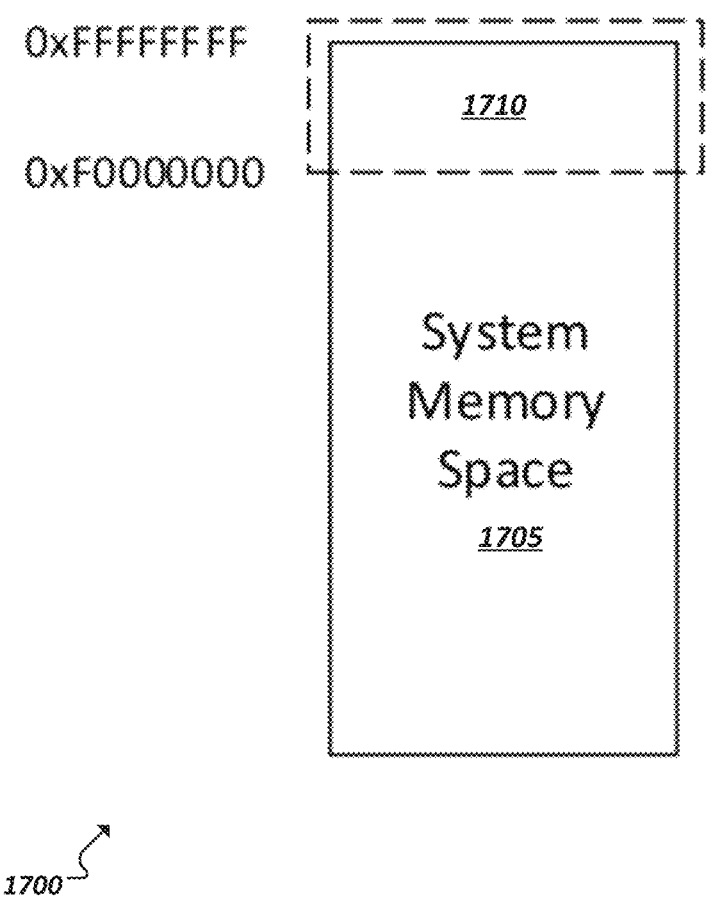
FIG. 17 illustrates a simplified block diagram of an example memory system.

Turning to the simplified block diagram 1700 of FIG. 17, in some implementations, particular regions (e.g., 1710) in the system memory space 1705 may be purposefully or incidentally associated with storing data of a particular data type, such that memory transactions involving a corresponding address range may be statistically likely to involve a particular data type (e.g., integer, floating point, ASCII, etc.). Corresponding comparison windows may be defined and available for selection for a variety of data types, including the particular data type. Accordingly, in one example, when a memory transaction involving memory within a particular address range is identified, hint information may be presented or obtained by the compression engine to select the most appropriate comparison window/comparison pattern definition that will maximize compression of memory requests involving such data. In some cases, the address of the request itself may be the hint information for variable compression. For instance, if the particular region 1710 is most likely to involve floating point data, a hint may be provided to select a comparison window in the LSB of the corresponding memory request data and this comparison window may be compared to a pattern of all-zeroes (e.g., based on the assumption that the last eight bits of floating data are most likely to be all "0"). It should be appreciated that, while some of the examples above described pre-defined comparison patterns of all-zeroes to compare against comparison windows in data to be compressed, any potential binary pattern (including mixes of 1's and 0's) may be included in such a pattern if analysis of data in the system suggests that such a pattern appears in the data in a statistically meaningful way, among other examples.

As the comparison pattern may also be used by the decoder to accurately decode compressed/uncompressed inputs it receives, hint information used by a compression engine may also be shared with the decode-side of the transaction. Otherwise, when reading back data, the system may not be able to determine which comparison window was used to "compress" in the ECC information. In some implementations, one or more additional bits of data (e.g., in the ECC) may be sacrificed to directly communicate the hint information used, in-band, within the request. In other implementations, a sideband channel may be utilized to account for hints used by the encoder. In other implementations, when a defined memory region or address range is used as the basis for the hint, the memory module and decoder can infer the hint based on the address being read, among other examples of aligning the encoder and decoder on the comparison window and pattern to be used to compress/encode and then decompress/decode the data, among other examples.

Turning to FIGS. 18A-18B, an example H-matrix for use in generating example ECC information is shown (the first half 1800a of the H-matrix illustrated in FIG. 18A and the second half 1800b of the same H-matrix illustrated in FIG. 18B). As noted above, an ECC may be specially defined to provide enhanced protection (over other bits in the data) for a metadata bit used to convey whether an output of an encoder was compressed or not. For instance, as noted in the example of FIGS. 15A-15B, a proposed ECC decoder may utilize a 72-bit codeword to detect and correct errors when decoding. If the data message returned from the memory was originally compressed, the pre-defined pattern (8 b) can be reused to compose the 72-bit codeword. In contrast, if the data is not originally compressed, the 72-bit codeword cannot be composed by a single memory read and one extra read request must be followed to retrieve the corresponding overflow bits. The metadata bit is an identifier for the compression and the decision whether an extra read request is to be made to obtain the overflow bits, all based on the value of the meta data. However, a check is needed to confirm if metadata bit itself is corrupted. Thus, the proposed ECC and its H-matrix are designed to always protect the meta data even with incomplete codeword composed by a single read data (64 b). Further, FIG. 19 illustrates the corresponding syndrome patterns (e.g., 1910, 1915, 1920, 1925, 1930) corresponding to various error locations.

Continuing with the examples of FIGS. 18A-18B and 19, because each data field (e.g., overflow, metadata, data, and parity) belong to different categories in the H-matrix, errors in each different field create different syndrome patterns. For example, if only meta-bit is corrupted, the syndrome becomes {100000}. Also, any number and pattern of errors in the overflow yield {00, even number of 1} of syndrome (e.g., {0000011} and {0011011}). Thus, if the uncompressed data has an error in the metadata bit and errors in the overflow field at the same time, the generated syndrome pattern becomes {10, even number of 1}. Moreover, this syndrome can be differentiated from the syndrome generated by errors in the parity field, {1, odd number of 1}. As a result, an error in the metadata bit can be always corrected regardless of the compression, among other example schemes, which enable correctability of the metadata bit to be guaranteed.

Figure 20:
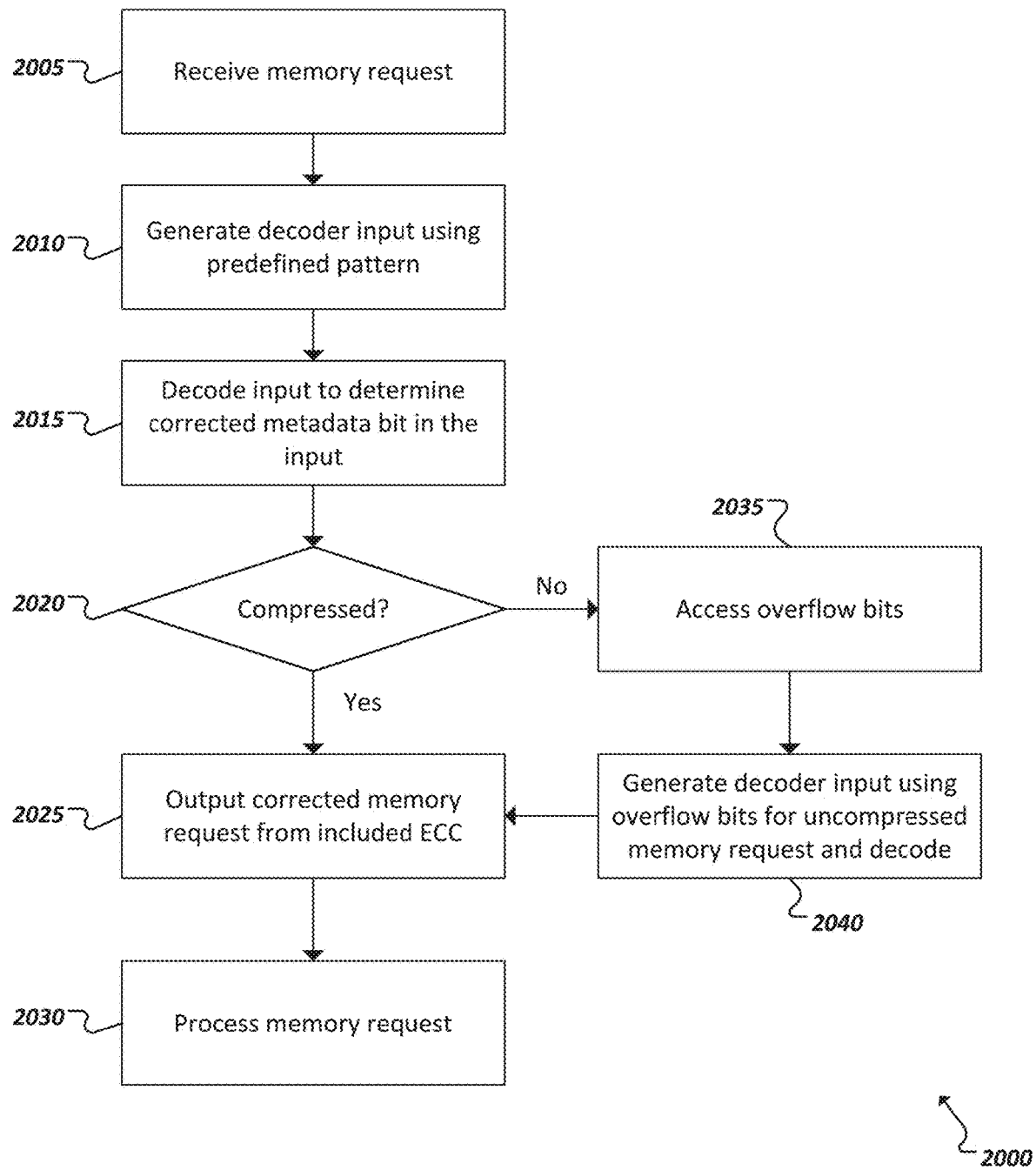
FIG. 20 is a flow diagram of an example process of decoding an example memory request with an included error correction code.

FIG. 20 is a simplified flow diagram illustrating an example technique for decoding a memory request, which includes ECC information and metadata to indicate whether the memory request, from which the ECC information was determined, was compressed or uncompressed. For instance, a memory request may be received 2005 (e.g., from a memory controller) and a decoder input may be generated by attempting to restore bits that were removed in a potential compression of the memory request. For instance, a known comparison pattern may be added back to the received memory request to regenerate the assumer memory request contents from which the included ECC information was generated and generate 2010 an input for the decoder. The input may be decoded 2015 to generate a version of the original memory request as corrected (if necessary) using the included ECC information. Additionally, the metadata may be corrected to confirm whether the corresponding memory request was compressed or not (at 2020). If it is determined from the metadata that the received memory request was indeed compressed, the output of the decoder may be considered accurate (at 2025) and, if correctable using the included ECC, may be provided for processing 2030 in accordance with the contents of the request. However, if it is determined from the metadata that the received memory request is uncompressed, then overflow bits not included in the memory request as received will be accessed 2035 (e.g., through an additional read) to rebuild the input for another decoding 2040 by the decoder using the accessed overflow bits instead of the predefined pattern bits. The result of this second, or retried, decoding using the overflow bits in an uncompressed memory request may be considered accurate and, if correctable using the included ECC, may be provided for processing 2030 in accordance with the contents of the request.

Figure 21:
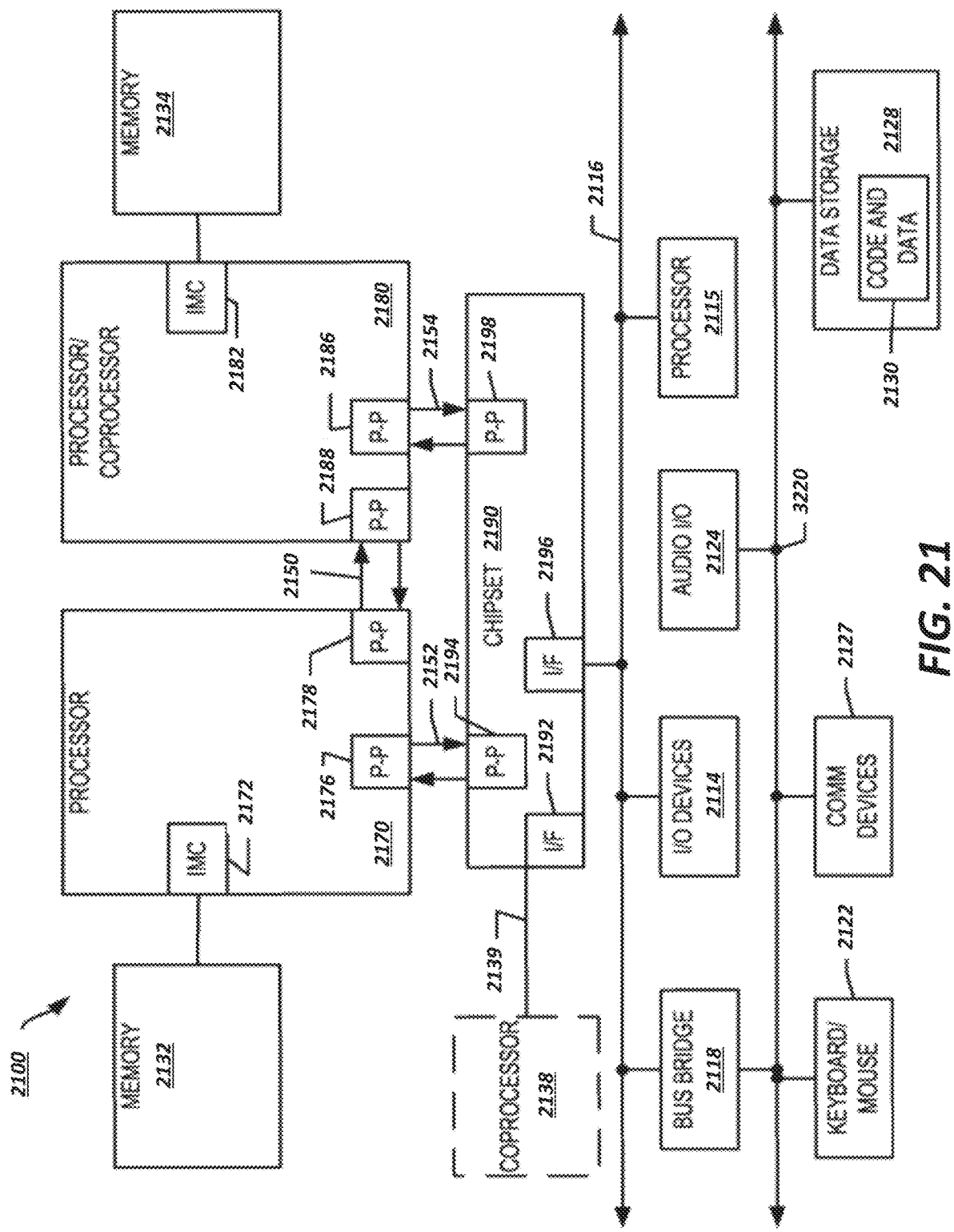
FIG. 21 is a block diagram of a more specific exemplary system.

Referring now to FIG. 21, shown is a block diagram of a first more specific exemplary system 2100 in accordance with an embodiment of the present disclosure. As shown in FIG. 21, multiprocessor system 2100 is a point-to-point interconnect system, and includes a first processor 2170 and a second processor 2180 coupled via a point-to-point interconnect 2150. In one embodiment first and second processor may be two interconnect graph processor devices, two dense processor device, or a graph processor device coupled to a dense processor device, among other examples.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet is connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present disclosure is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
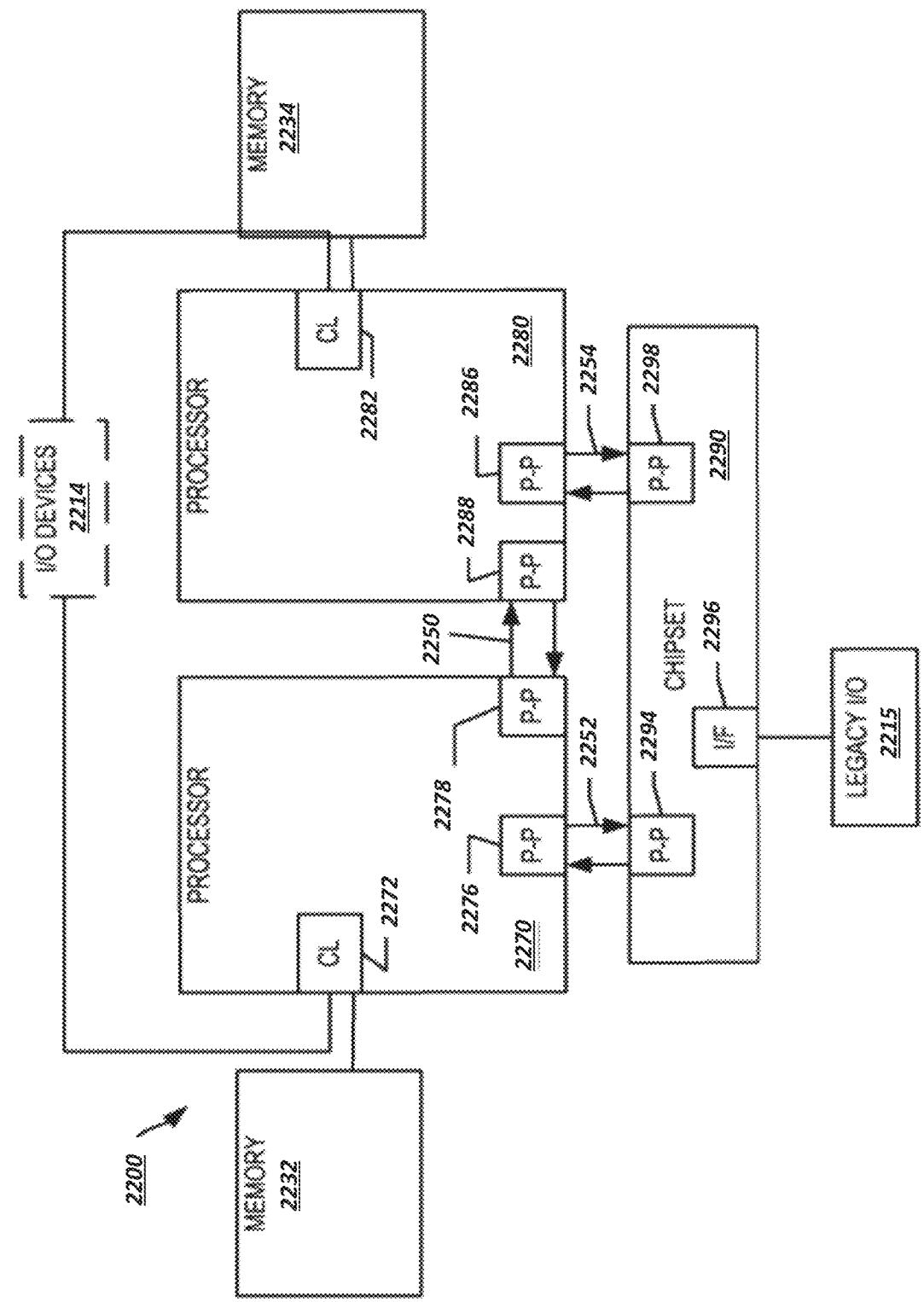
FIG. 22, shown is a block diagram of a second more specific exemplary system.

Referring now to FIG. 22, shown is a block diagram of a second more specific exemplary system 2200 in accordance with an embodiment of the present disclosure. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
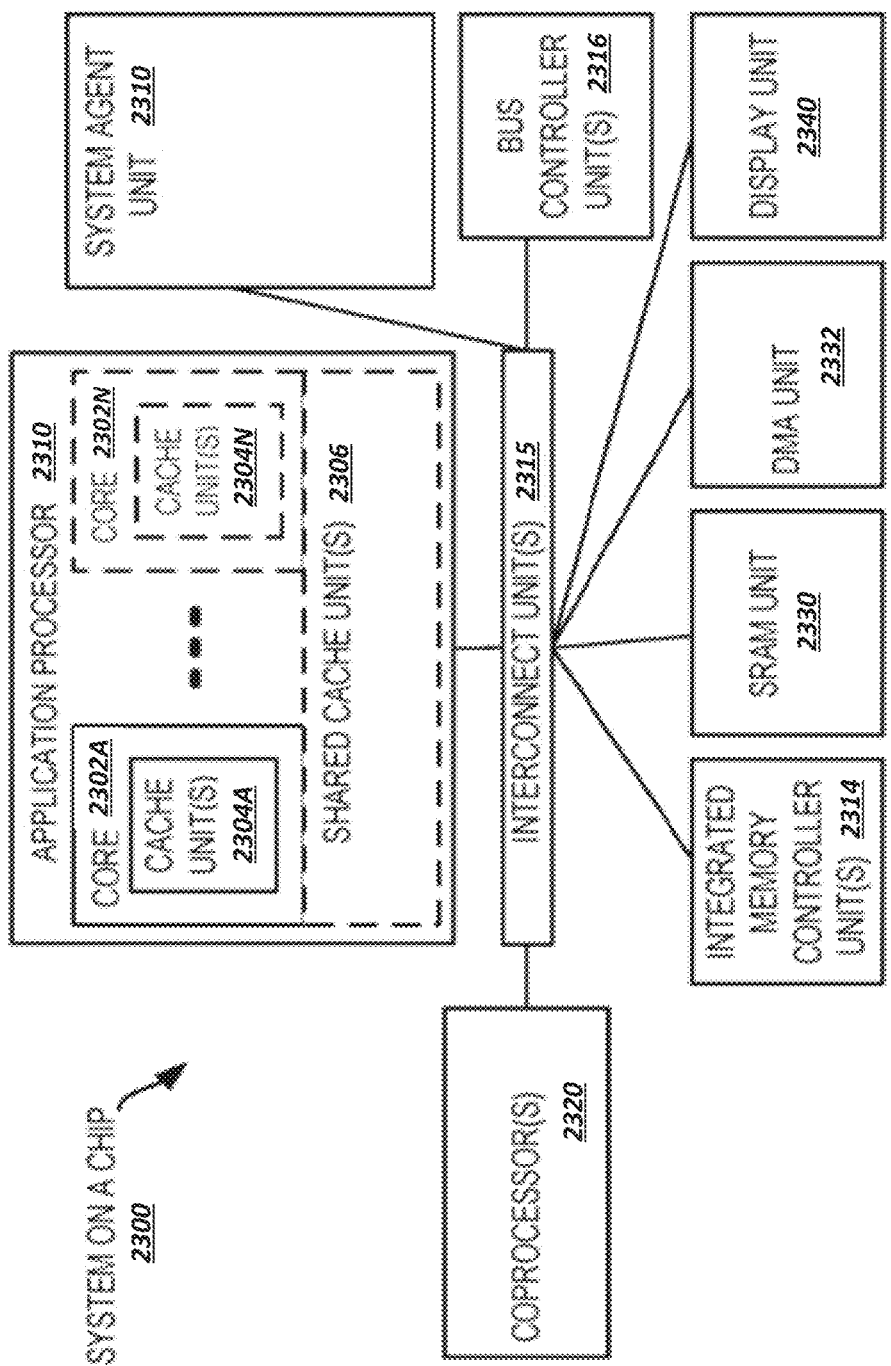
FIG. 23, shown is a block diagram of a system on a chip (SoC).

Referring now to FIG. 23, shown is a block diagram of a SoC 2300 in accordance with an embodiment of the present disclosure. Also, dashed lined boxes are optional features on more advanced SoCs. In FIG. 23, an interconnect unit(s) 2315 is coupled to: an application processor 2310 which includes a set of one or more cores 2302A-N and shared cache unit(s) 2306; a system agent unit 2310; a bus controller unit(s) 2316; an integrated memory controller unit(s) 2314; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems including at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

"Logic" (e.g., as found in offload engines, memory managers, memory controllers, network controllers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

It should be appreciated that logic, engines, components, and modules, as discussed above, may be implemented entirely in hardware circuitry, firmware, or software. In other instances, logic, engines, modules, and components may be implemented through a combination of hardware circuitry, firmware, or software. In some cases, components described as implemented at least partially in hardware may be emulated or simulated in hardware, such as in a system simulator, among other example implementations.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: an interface to couple a device to a memory device, where the interface includes: encoder circuitry to: identify a memory request to be sent to the memory device; identify a comparison window in the memory request, where the comparison window includes a subset of bits of the memory request; compare the subset of bits to a pre-defined pattern to determine whether the subset of bits matches the pre-defined pattern, where a determination that the subset of bits matches the pre-defined pattern indicates that a compression can be applied to the memory request; generate an error correction code for the memory request; encode the memory request to remove the subset of bits, add the error correction code, and add at least one metadata bit to the memory request to generate a protected version of the memory request, where the at least one metadata bit identifies whether the compression was applied to the memory request; and a transmitter to send the protected version of the memory request to the memory device.

Example 2 includes the subject matter of example 1, where the interface it further to send the subset of bits to the memory device when the compression is not applied based on the subset of bits differing from the pre-defined pattern, where the subset of bits are to be sent in a separate memory transfer.

Example 3 includes the subject matter of any one of examples 1-2, where the device includes a computing core.

Example 4 includes the subject matter of example 3, where the computing core accesses memory of the memory device in fixed chunks.

Example 5 includes the subject matter of example 4, where the fixed chunks include 8-byte accesses and the memory includes random access memory.

Example 6 includes the subject matter of any one of examples 3-5, where the computing core includes a plurality of multi-threaded pipelines and at least one single-threaded pipeline.

Example 7 includes the subject matter of any one of examples 1-6, where the interface is further to: identify a hint associated with the memory request; select the pre-defined pattern and the comparison window for use with the memory request from a plurality of pattern-comparison window combinations.

Example 8 includes the subject matter of example 7, where the hint identifies a particular data type associated with the memory request and the pre-defined pattern and the comparison window are selected based on prevalence of the pre-defined pattern within the comparison window in data of the particular data type.

Example 9 includes the subject matter of any one of examples 1-8, where the error correction code guarantees correctability of an error to the at least one metadata bit.

Example 10 is a method including: identifying a memory request to be sent to a memory device over an interface, where the interface couples the memory device to a compute device; identifying a comparison window in the memory request, where the comparison window includes a subset of bits of the memory request; comparing the subset of bits to a pre-defined pattern to determine whether the subset of bits matches the pre-defined pattern, where a determination that the subset of bits matches the pre-defined pattern indicates that a compression can be applied to the memory request; generating an error correction code for the memory request; encoding the memory request to remove the subset of bits, add the error correction code, and add at least one metadata bit to the memory request to generate a protected version of the memory request, where the at least one metadata bit identifies whether the compression was applied to the memory request; and sending the protected version of the memory request to the memory device.

Example 11 includes the subject matter of example 10, further including sending the subset of bits to the memory device when the compression is not applied based on the subset of bits differing from the pre-defined pattern, where the subset of bits are to be sent in a separate memory transfer.

Example 12 includes the subject matter of any one of examples 10-11, where the compute device includes a computing core.

Example 13 includes the subject matter of example 12, where the computing core accesses memory of the memory device in fixed chunks.

Example 14 includes the subject matter of example 13, where the fixed chunks include 8-byte accesses and the memory includes random access memory.

Example 15 includes the subject matter of any one of examples 12-14, where the computing core includes a plurality of multi-threaded pipelines and at least one single-threaded pipeline.

Example 16 includes the subject matter of any one of examples 10-15, further including: identifying a hint associated with the memory request; and selecting the pre-defined pattern and the comparison window for use with the memory request from a plurality of pattern-comparison window combinations.

Example 17 includes the subject matter of example 16, where the hint identifies a particular data type associated with the memory request and the pre-defined pattern and the comparison window are selected based on prevalence of the pre-defined pattern within the comparison window in data of the particular data type.

Example 18 includes the subject matter of any one of examples 10-17, where the error correction code guarantees correctability of an error to the at least one metadata bit Example 19 is a system including means to perform the method of any one of examples 10-18.

Example 20 includes the subject matter of example 19, where the means includes a machine-readable storage medium with instructions stored thereon, the instructions executable to cause a machine to perform at least a portion of the method of any one of examples 10-18.

Example 21 is an apparatus including: a memory interface to couple a memory device to a compute core, where the memory interface includes: decoder circuitry to: receive a protected version of a memory request from the compute core, where the protected version of a memory request includes a compressed portion of the memory request, an error correction code, and a metadata bit; append a predefined pattern associated with a compression to the protected version of the memory request; perform a decoding of the protected version of the memory request with the appended predefined pattern to: determine, from the metadata bit, that compression was applied to the protected version of the memory request; and determine, from the error correction code and based on the compression applied to the protected version of the memory request, whether bit errors exist in the memory request.

Example 22 includes the subject matter of example 21, where the decoder circuitry is to validate the metadata bit based on the error correction code, where the metadata bit identifies whether the compression is applied to the protected version of the memory request.

Example 23 includes the subject matter of any one of examples 21-22, further including: error correction circuitry to correct at least one of the bit errors in the memory request; and memory management circuitry to process the memory request following correction of the at least one bit error.

Example 24 includes the subject matter of any one of examples 21-23, where the memory request is a first memory request, the decoder circuitry is further to: receive a protected version of a second memory request from the compute core, where the protected version of the second memory request includes a compressed portion of the second memory request, an error correction code based on the second memory request, and a metadata bit for the second memory request, where a portion of the second memory request is removed in the protected version of the second memory request; append the predefined pattern to the protected version of the second memory request; decode the protected version of the second memory request with the appended predefined pattern to identify that the compression is not applied to the second memory request based on the metadata bit for the second memory request; access the portion of the second memory request based on identifying that the compression is not applied to the second memory request; append the portion of the second memory request to generate an uncompressed version of the second memory request based on the metadata bit for the second memory request; and decode the uncompressed version of the second memory request to determine whether bit errors are present in the second memory request.

Example 25 includes the subject matter of example 24, where the portion of the second memory request is sent from the compute core to the memory interface in an additional memory transfer as overflow bits generated during encoding of the protected version of the second memory request.

Example 26 includes the subject matter of any one of examples 21-25, where the decoder circuitry is further to identify a hint associated with the memory request to identify a comparison window used by an encoder of the protected version of the second memory request.

Example 27 is a method including: receiving a protected version of a memory request from a compute core over a memory interface, where the protected version of a memory request includes a compressed portion of the memory request, an error correction code, and a metadata bit; appending a predefined pattern associated with a compression to the protected version of the memory request; performing a decoding of the protected version of the memory request with the appended predefined pattern to: determine, from the metadata bit, that compression was applied to the protected version of the memory request; and determine, from the error correction code and based on the compression applied to the protected version of the memory request, whether bit errors exist in the memory request.

Example 28 includes the subject matter of example 27, further including validating the metadata bit based on the error correction code, where the metadata bit identifies whether the compression is applied to the protected version of the memory request.

Example 29 includes the subject matter of any one of examples 27-28, further including: correcting at least one of the bit errors in the memory request; and processing the memory request following correction of the at least one bit error.

Example 30 includes the subject matter of any one of examples 27-29, where the memory request is a first memory request, the method further including: receiving a protected version of a second memory request from the compute core, where the protected version of the second memory request includes a compressed portion of the second memory request, an error correction code based on the second memory request, and a metadata bit for the second memory request, where a portion of the second memory request is removed in the protected version of the second memory request; appending the predefined pattern to the protected version of the second memory request; decoding the protected version of the second memory request with the appended predefined pattern to identify that the compression is not applied to the second memory request based on the metadata bit for the second memory request; accessing the portion of the second memory request based on identifying that the compression is not applied to the second memory request; appending the portion of the second memory request to generate an uncompressed version of the second memory request based on the metadata bit for the second memory request; and decoding the uncompressed version of the second memory request to determine whether bit errors are present in the second memory request.

Example 31 includes the subject matter of example 30, where the portion of the second memory request is sent from the compute core to the memory interface in an additional memory transfer as overflow bits generated during encoding of the protected version of the second memory request.

Example 32 includes the subject matter of any one of examples 27-31, further including identifying a hint associated with the memory request to identify a comparison window used by an encoder of the protected version of the second memory request.

Example 33 is a system including means to perform the method of any one of examples 27-32.

Example 34 includes the subject matter of example 33, where the means includes a machine-readable storage medium with instructions stored thereon, the instructions executable to cause a machine to perform at least a portion of the method of any one of examples 27-32.

Example 35 is a system including: a computing device; a memory device coupled to the computing device by an interface, where the computing device includes: compression circuitry to: determine whether a memory request can be compressed based on a comparison of a subset of bits of the memory request in a comparison window with a predefined pattern; compress the memory request to generate a compressed version of the memory request, where compression of the memory request includes removal of the subset of bits based on a determination that the subset of bits match the predefined pattern; and encoder circuitry to: generate an error correction code for the memory request; add the error correction code and add at least one metadata bit to the compressed memory request to generate a protected version of the memory request, where the at least one metadata bit identifies whether compression is applied to the memory request; and transmitter circuitry to send the protected version of the memory request to the memory device; where the memory device includes decoder circuitry to identify whether bit errors are present in the protected version of the memory request based on the error correction code.

Example 36 includes the subject matter of example 35, where the decoder circuitry is to: determine from metadata bits included in received memory requests, whether the received memory requests have been subjected to compression by the compression circuitry; generate a corrected version of the received memory requests based on error correction codes in the received memory requests, when the received memory requests have been subject to compression by the compression circuitry; and access overflow data associated with received memory requests when the received memory requests have not been compressed by the compression circuitry, where the overflow data is used to retry decoding of the received memory requests not subjected to compression by the compression circuitry.

Example 37 includes the subject matter of any one of examples 35-36, where the compression circuitry is further to: identify a hint associated with the memory request; and select, based on the hint, the comparison window for use with compression of the memory request, from a plurality of different comparison windows.

Example 38 includes the subject matter of any one of examples 35-37, where the computing device further includes a memory controller, and the memory controller includes the compression circuitry and the encoder circuitry.

Example 39 includes the subject matter of any one of examples 35-38, where the computing device includes a plurality of multithreaded pipelines, and the interface includes a narrow fixed memory channel narrower than a defined memory request width.

Example 40 includes the subject matter of any one of examples 35-39, wherein the computing device comprises a graph processing core.

Example 41 is an apparatus including: encoder circuitry to: compare a subset of bits in a memory request to a pre-defined pattern to determine whether the subset of bits matches the pre-defined pattern, where a determination that the subset of bits matches the pre-defined pattern indicates that a compression can be applied to the memory request; generate an error correction code for the memory request; and encode the memory request to remove the subset of bits based on the compression, add the error correction code, and add at least one metadata bit to the memory request to generate a protected version of the memory request, where the at least one metadata bit identifies whether the compression was applied to the memory request; and a transmitter to send the protected version of the memory request to the memory device.

Example 42 includes the subject matter of example 41, where memory request is addressed to a memory device, the subset of bits are to be sent to the memory device when the compression is not applied based on the subset of bits differing from the pre-defined pattern, where the subset of bits are to be sent in a separate memory transfer.

Example 43 includes the subject matter of any one of examples 41-42, where the device includes a computing core and the memory request is directed to a memory device.

Example 44 includes the subject matter of example 43, where the computing core accesses memory of the memory device in fixed chunks.

Example 45 includes the subject matter of example 44, where the fixed chunks include 8-byte accesses and the memory includes random access memory.

Example 46 includes the subject matter of any one of examples 43-45, where the computing core includes a plurality of multi-threaded pipelines and at least one single-threaded pipeline.

Example 47 includes the subject matter of example 41, where the encoder circuitry is further to: identify a hint associated with the memory request; and select the pre-defined pattern and the subset of bits for comparison based on the hint.

Example 48 includes the subject matter of example 47, where the hint identifies a particular data type associated with the memory request and the pre-defined pattern and the subset of bits are selected based on prevalence of the pre-defined pattern in data of the particular data type.

Example 49 includes the subject matter of example 41, where the error correction code guarantees correctability of an error to the at least one metadata bit.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   encoder circuitry to:
      compare a subset of bits in a memory request to a pre-defined pattern to determine whether the subset of bits matches the pre-defined pattern;
      perform a compression of the memory request based on a determination that the subset of bits matches the pre-defined pattern, wherein the compression of the memory request comprises:
         generate an error correction code for the memory request; and
         encode the memory request to remove the subset of bits based on the compression, and add the error correction code and at least one metadata bit to the memory request to generate a protected version of the memory request, wherein the at least one metadata bit identifies whether the compression was applied to the memory request, and a length of the protected version of the memory request is less than or equal to a length of the memory request; and a transmitter to send the protected version of the memory request to a memory device.

2. The apparatus of claim 1, wherein the memory request is addressed to a memory device, the subset of bits are to be sent to the memory device when the compression is not applied based on the subset of bits differing from the pre-defined pattern, wherein the subset of bits are to be sent in a separate memory transfer.

3. The apparatus of claim 1, wherein the device comprises a computing core and the computing core accesses memory of the memory device in fixed chunks.

4. The apparatus of claim 3, wherein the fixed chunks comprise 8-byte accesses and the memory comprises random access memory.

5. The apparatus of claim 1, wherein the device comprises a computing core and the computing core comprises a plurality of multi-threaded pipelines and at least one single-threaded pipeline.

6. The apparatus of claim 1, wherein the encoder circuitry is further to:
identify a hint associated with the memory request;
select the pre-defined pattern and the subset of bits for comparison based on the hint.

7. The apparatus of claim 6, wherein the hint identifies a particular data type associated with the memory request and the pre-defined pattern and the subset of bits are selected based on prevalence of the pre-defined pattern in data of the particular data type.

8. The apparatus of claim 1, wherein the error correction code guarantees correctability of an error to the at least one metadata bit.

9. An apparatus comprising:
a memory interface to couple a memory device to a compute core, wherein the memory interface comprises:
decoder circuitry to:
receive a protected version of a memory request from the compute core, wherein the protected version of a memory request comprises a compressed portion of the memory request, an error correction code, and a metadata bit;
append a predefined pattern associated with a compression to the protected version of the memory request;
perform a decoding of the protected version of the memory request with the appended predefined pattern to:
determine, from the metadata bit, that compression was applied to the protected version of the memory request; and
determine, from the error correction code and based on the compression applied to the protected version of the memory request, whether bit errors exist in the memory request.

10. The apparatus of claim 9, wherein the decoder circuitry is to validate the metadata bit based on the error correction code, wherein the metadata bit identifies whether the compression is applied to the protected version of the memory request.

11. The apparatus of claim 9, further comprising:
error correction circuitry to correct at least one of the bit errors in the memory request; and
memory management circuitry to process the memory request following correction of the at least one bit error.

12. The apparatus of claim 9, wherein the memory request is a first memory request, the decoder circuitry is further to:

receive a protected version of a second memory request from the compute core, wherein the protected version of the second memory request comprises a compressed portion of the second memory request, an error correction code based on the second memory request, and a metadata bit for the second memory request, wherein a portion of the second memory request is removed in the protected version of the second memory request;
append the predefined pattern to the protected version of the second memory request;
decode the protected version of the second memory request with the appended predefined pattern to identify that the compression is not applied to the second memory request based on the metadata bit for the second memory request;
access the portion of the second memory request based on identifying that the compression is not applied to the second memory request;
append the portion of the second memory request to generate an uncompressed version of the second memory request based on the metadata bit for the second memory request; and
decode the uncompressed version of the second memory request to determine whether bit errors are present in the second memory request.

13. The apparatus of claim 12, wherein the portion of the second memory request is sent from the compute core to the memory interface in an additional memory transfer as overflow bits generated during encoding of the protected version of the second memory request.

14. The apparatus of claim 12, wherein the decoder circuitry is further to identify a hint associated with the memory request to identify a comparison window used by an encoder of the protected version of the second memory request.

15. A system comprising:
a computing device;
a memory device coupled to the computing device by an interface,
wherein the computing device comprises:
compression circuitry to:
compare a subset of bits in a memory request to a pre-defined pattern to determine whether the subset of bits matches the pre-defined pattern; and
compress the memory request based on a determination that the subset of bits in the memory request match the pre-defined pattern, wherein the memory request is compressed to generate a compressed version of the memory request, wherein compression of the memory request comprises removal of the subset of bits; and
encoder circuitry to:
generate an error correction code for the memory request;
add the error correction code and at least one metadata bit to the compressed memory request to generate a protected version of the memory request, wherein the at least one metadata bit identifies whether compression is applied to the memory request, and a length of the protected version of the memory request is less than or equal to a length of the memory request; and
transmitter circuitry to send the protected version of the memory request to the memory device;

wherein the memory device comprises decoder circuitry to identify whether bit errors are present in the protected version of the memory request based on the error correction code.

16. The system of claim 15, wherein the decoder circuitry is to:
   determine from metadata bits included in received memory requests, whether the received memory requests have been subjected to compression by the compression circuitry;
   generate a corrected version of the received memory requests based on error correction codes in the received memory requests, when the received memory requests have been subject to compression by the compression circuitry; and
   access overflow data associated with received memory requests when the received memory requests have not been compressed by the compression circuitry, wherein the overflow data is used to retry decoding of the received memory requests not subjected to compression by the compression circuitry.

17. The system of claim 16, wherein the compression circuitry is further to:
   identify a hint associated with the memory request; and
   select, based on the hint, a comparison window for use with compression of the memory request, from a plurality of different comparison windows.

18. The system of claim 16, wherein the computing device further comprises a memory controller, and the memory controller comprises the compression circuitry and the encoder circuitry.

19. The system of claim 16, wherein the computing device comprises a plurality of multithreaded pipelines, and the interface comprises a narrow fixed memory channel narrower than a defined memory request width.

* * * * *